(12) United States Patent
Bali et al.

(10) Patent No.: US 8,065,658 B1
(45) Date of Patent: Nov. 22, 2011

(54) TOOL FOR VISUALIZING SOFTWARE ARCHITECTURE

(75) Inventors: Naveen Bali, Cary, NC (US); Amit Prakash Sawant, Raleigh, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1071 days.

(21) Appl. No.: 11/890,927

(22) Filed: Aug. 7, 2007

(51) Int. Cl.
*G06F 9/44* (2006.01)

(52) U.S. Cl. ........................................ 717/113

(58) Field of Classification Search ............... 717/113
See application file for complete search history.

(56) References Cited

U.S. PATENT DOCUMENTS

| | | | |
|---|---|---|---|
| 5,860,004 A * | 1/1999 | Fowlow et al. | 717/109 |
| 5,915,113 A * | 6/1999 | McDonald et al. | 717/109 |
| 5,926,189 A * | 7/1999 | Beaman et al. | 345/467 |
| 6,268,862 B1 * | 7/2001 | Uchiyama et al. | 345/427 |
| 6,714,199 B1 * | 3/2004 | Beaman et al. | 345/469 |
| 6,941,515 B1 * | 9/2005 | Wilkins | 715/719 |
| 7,523,023 B1 * | 4/2009 | Koh et al. | 717/120 |
| 2007/0288885 A1 * | 12/2007 | Brunel et al. | 717/104 |

OTHER PUBLICATIONS

Chuah et al., "Glyphs for software Visualization", 1997, IEEE.*
Panas et al., "Comprehending Software Architecture using a Single-View Visualization", Jan. 17, 2007, IEEE.*
Amit P. Sawant and Christopher G. Healey, "Visualizing Abstract Data Using Animation", IEEE Visualization Conference 2006, 4 pages total including Conference Program (2 pgs), available at: http://vis.computer.org/Vis2006, Abstract (2 pgs) available at : http://sequoia.csc.ncsu.edu/~apsawant/pdfs/Vis_2006_poster_abstract.pdf, Oct. 29-Nov. 2006.
Amit P. Sawant, Christopher G. Healey, and Matti Vanninen, "*PerfViz*: A Visualization Tool for Analyzing, Exploring, and Comparing Storage Controller Performance Data", available at: http://www.csc.ncsu.edu/faculty/healey/download/vda.07.pdf, (11 pgs), including Conference on Visualization and Data Analysis 2007, Conference Schedule (4 pgs) available at: http://vw.indiana.edu/vda2007/, Jan. $28^{th}$ —Feb. 1, 2007.
Dewayne E. Perry and Alexander L. Wolf, "Foundation for the Study of Software Architecture", ACM Sigsoft Software Engineering Notes vol. 17 No. 4, Oct 1992 pp. 40-52.
Paul C. Clements, "A Survey of Architecture Description Languages", Proceedings of IWSSD-8, IEEE 1996, pp. 16-25.
Electronic Textbook StatSoft, http://statsoft.com/textbook/stmulsca.html, "Multidimensional Scaling", Copyright StaSoft, Inc. 1984-2003, 4 pages.

(Continued)

*Primary Examiner* — Anna Deng
*Assistant Examiner* — Junchun Wu
(74) *Attorney, Agent, or Firm* — Blakely, Sokoloff, Taylor & Zafman LLP

(57) ABSTRACT

An automated tool for partitioning the source code of a software system at heuristic architectural boundaries identified by a bug-reporting process, and for representing the architecture of the software system as a set of visual attributes without constraining the representation to any particular predefined architectural style. The attributes are visualized applying multi-dimensional mapping techniques to software components to generate visual maps of the relationships and interactions among software components that cannot be easily understood or assimilated in a non-graphical form.

13 Claims, 21 Drawing Sheets

OTHER PUBLICATIONS

Sami Kaski, "Multidimensional scaling", http://cis.hut.fi/sami/thesis/node15.html, Mar. 31, 1997, 3 pages.

Forrest W. Young, "Multidimensional Scaling", http://forrest.psych.unc.edu/teaching/p208a/mds/mds.html, 1985, 8 pages.

Rick Kazman and S. Jeromy Carriere, "Playing Detective: Reconstructing Software Architecture from Available Evidence", Technical Report, Oct. 1997, 52 pages.

David Garland and Mary Shaw, "An Introduction to Software Architecture", School of Computer Science, Carnegie Mellon University, Jan. 1994, 42 pages.

Stephen P. Borgatti, "Multidimensional Scaling", http://www.analytictech.com/borgatti/mds/htm, 1997, 6 pages.

Scientific Toolworks, Inc., "Scitools —Maintenance, Metrics and Documentation Tools for Ada, C, C++, Java and O. . .", http://www/scitools.com/products/understand/cpp/product.php, Jun. 6, 2007, 1 page.

Carnegie Mellon University: Courses, Conferences, Building your skills, Licensing, "Architecture Description Languages, Software Technology Roadmap", http://www.sei.cmu.edu/str/descriptions/adl_body.html, Jan. 11, 2007, 6 pages.

Wojciech Basalaj, "Section 2.4 Multidimensional Scaling", in *Proximity Visualisation of Abstract Data*, http://www.pavis.orq/essay/pavis.pdf, http://www.pavis.orq/essay/multivariate_visualization_techniques.html#SECTION003400, Jan. 2001, pp. 15-17.

Wojciech Basalaj, "Chapter 3 Multidimensional Scaling", in *Proximity Visualisation of Abstract Data*, http://www.pavis.orq/essay/pavis.pdf, http://www.pavis.orq/essay/multidimensional_scalimhtml, Jan. 2001, pp. 21-50.

Wikipedia, the free encyclopedia, "Software architecture", http://en.wikipedia.orq/wiki/Software_architecture, Apr. 15, 2007, 6 pages.

* cited by examiner

|  | Seattle | Minneapolis | Boston | Reno | Denver | Raleigh | LA | Austin | Miami |
|---|---|---|---|---|---|---|---|---|---|
| Seattle | 0 | 1377 | 2456 | 557 | 1003 | 2318 | 942 | 1739 | 2685 |
| Minneapolis | 1377 | 0 | 1106 | 1384 | 683 | 966 | 1514 | 1023 | 1483 |
| Boston | 2456 | 1106 | 0 | 2485 | 1739 | 603 | 2572 | 1670 | 1243 |
| Reno | 557 | 1384 | 2485 | 0 | 781 | 2206 | 386 | 1380 | 2427 |
| Denver | 1003 | 683 | 1739 | 781 | 0 | 1425 | 837 | 759 | 1692 |
| Raleigh | 2318 | 966 | 603 | 2206 | 1425 | 0 | 2205 | 1143 | 693 |
| LA | 942 | 1514 | 2572 | 386 | 837 | 2205 | 0 | 1219 | 2307 |
| Austin | 1739 | 1023 | 1670 | 1380 | 759 | 1143 | 1219 | 0 | 1091 |
| Miami | 2685 | 1483 | 1243 | 2427 | 1692 | 693 | 2307 | 1091 | 0 |

Figure 3

| Component | Files | Threads | Global Variables | Global Functions | Local Functions |
|---|---|---|---|---|---|
| admin | 491 | 500 | 812 | 2187 | 2670 |
| autosupport | 21 | 2 | 386 | 93 | 89 |
| cifs | 491 | 60 | 666 | 3309 | 1973 |
| cmds | 329 | 26 | 516 | 1463 | 3608 |
| coredump | 25 | 2 | 217 | 108 | 179 |
| counters | 407 | 1 | 12 | 121 | 94 |
| dense | 26 | 4 | 48 | 92 | 88 |
| dfm | 11 | 0 | 38 | 50 | 29 |
| dump | 21 | 1 | 8 | 115 | 175 |
| ems | 41 | 7 | 106 | 334 | 143 |
| filerview | 289 | 0 | 0 | 0 | 0 |
| java | 1215 | 2 | 170 | 1435 | 768 |
| kernel | 781 | 64 | 1404 | 2105 | 1400 |
| network drivers | 647 | 25 | 570 | 3705 | 1985 |
| nvram | 30 | 3 | 135 | 259 | 176 |
| platform | 1281 | 60 | 2113 | 5669 | 7500 |
| storage | 422 | 66 | 1397 | 3654 | 3010 |

Figure 5

| | admin | autosupport | cifs | cmds | coredump | counters | dense | dfm | dump | ems | filerview | java | kernel | network drivers | nvram | platform | storage |
|---|---|---|---|---|---|---|---|---|---|---|---|---|---|---|---|---|---|
| admin | 10151 | 154 | 862 | 1638 | 0 | 40 | 12 | 0 | 42 | 31 | 0 | 61 | 438 | 55 | 0 | 370 | 142 |
| autosupport | 16 | 294 | 0 | 11 | 2 | 0 | 0 | 0 | 0 | 3 | 0 | 0 | 17 | 0 | 16 | 120 | 10 |
| cifs | 206 | 2 | 6398 | 683 | 0 | 12 | 0 | 0 | 0 | 0 | 0 | 1 | 169 | 49 | 0 | 51 | 22 |
| cmds | 333 | 0 | 220 | 5241 | 0 | 5 | 2 | 0 | 0 | 3 | 0 | 15 | 154 | 124 | 0 | 216 | 234 |
| coredump | 8 | 0 | 0 | 2 | 161 | 0 | 0 | 0 | 0 | 0 | 0 | 0 | 14 | 0 | 0 | 10 | 8 |
| counters | 50 | 2 | 61 | 260 | 0 | 132 | 0 | 0 | 0 | 0 | 0 | 0 | 3 | 3 | 0 | 0 | 0 |
| dense | 10 | 0 | 0 | 87 | 0 | 1 | 239 | 0 | 0 | 0 | 0 | 0 | 2 | 7 | 0 | 0 | 0 |
| dfm | 34 | 2 | 4 | 97 | 1 | 0 | 0 | 76 | 7 | 0 | 0 | 0 | 9 | 0 | 0 | 4 | 50 |
| dump | 0 | 0 | 0 | 1 | 0 | 0 | 0 | 0 | 336 | 0 | 0 | 0 | 1 | 0 | 0 | 0 | 0 |
| ems | 1 | 1 | 0 | 7 | 0 | 0 | 0 | 0 | 0 | 686 | 0 | 0 | 11 | 1 | 2 | 155 | 0 |
| filerview | 0 | 0 | 0 | 0 | 0 | 0 | 0 | 0 | 0 | 0 | 0 | 0 | 0 | 0 | 0 | 0 | 0 |
| java | 13 | 0 | 80 | 56 | 0 | 0 | 0 | 0 | 0 | 0 | 0 | 0 | 109 | 3 | 0 | 24 | 1 |
| kernel | 5844 | 590 | 5816 | 18202 | 380 | 341 | 241 | 35 | 416 | 396 | 0 | 3788 | 5427 | 6297 | 325 | 20356 | 8283 |
| network drivers | 3 | 0 | 33 | 33 | 0 | 6 | 0 | 0 | 0 | 0 | 0 | 0 | 9 | 10487 | 0 | 290 | 36 |
| nvram | 0 | 0 | 0 | 1 | 2 | 0 | 0 | 0 | 0 | 16 | 0 | 774 | 37 | 3 | 305 | 255 | 0 |
| platform | 101 | 13 | 3 | 318 | 52 | 12 | 7 | 0 | 0 | 39 | 0 | 55 | 644 | 1014 | 149 | 20999 | 748 |
| storage | 56 | 5 | 88 | 53 | 27 | 2 | 0 | 0 | 0 | 0 | 0 | 0 | 54 | 60 | 0 | 941 | 11698 |

Figure 6

TOOL FOR VISUALIZING SOFTWARE ARCHITECTURE

COPYRIGHT NOTICE PURSUANT TO 37 CFR 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relate to software architecture and, in particular, to methods and tools for visualizing the architecture of software programs and systems.

BACKGROUND

The software architecture of a program or computing system is the structure or structures of the system, which comprise software elements, the externally visible properties of those elements, and the relationships between them. The term also refers to documentation of a system's software architecture. Documenting software architecture facilitates communication between software designers, documents early decisions about high-level design, and allows reuse of software components and structures between projects. Software architecture is an essential part of the design process, giving programming teams the ability to work together as a group and to see how all the components will link together.

Architecture description languages (ADLs) are used to describe a software architecture. Several different ADLs have been developed by different organizations, including Wright (developed by Carnegie Mellon), Acme (developed by Carnegie Mellon), xADL (developed by UCI), Darwin (developed by Imperial College London), DAOP-ADL (developed by University of Málaga).

Software architecture is commonly organized in views, which are analogous to the different types of blueprints made in building architecture. Within the ontology established by ANSI/IEEE 1471-2000, views are instances of viewpoints, where a viewpoint exists to describe the architecture in question from the perspective of a given set of stakeholders and their concerns. Some possible views are:
  Functional/logic view
  Code view
  Development/structural view
  Concurrency/process/thread view
  Physical/deployment view
  User action/feedback view Software architecture has been described as a collection of components together with a description of the interactions between these components. Software architecture has also been described as a set of elements including processing elements, data elements and connecting elements that can be represented in some type of block diagram or flowchart.

There are many well-known styles of software architecture that software designers and developers regularly use. Terms that describe style, such as client-server, object-oriented, distributed, multi-processor, layered, message passing and pre-emptive are widely used and software designers and developers have an intuitive understanding of their meaning without a rigorous definition. Most software implementations, however, especially large projects, are hybrids of various styles of architecture and cannot be easily classified or analyzed with respect to a single style.

Software architectures for most software systems are not documented and even when they are documented, the actual implementations deviate from the intended architecture. There are at least two causes for this deviation. Firstly, a software system does not have a single architecture. It may have many, depending on a particular point of view. There is a run-time architecture, a data-flow architecture, a control-flow architecture, a code-structure architecture and so on. Secondly, the architecture that is represented in a system's documentation may not coincide with any of these views as the software evolves over time through new releases.

A description of a large software system with any of the conventional ADLs mentioned above will be incomplete because some pieces of the software will not fit the particular architectural style used by the ADL. Additionally, non-graphical methods for describing software architecture (e.g., tables) are difficult to read and understand. It would be advantageous, therefore, to have a tool for visualizing software architecture without constraining the visualization to any single predefined style so that the software architecture can be characterized, explored and understood at any stage of development, deployment or revision.

SUMMARY

Embodiments of the invention advantageously provide an automated tool for partitioning the source code of a software system at architectural boundaries identified by a bug-reporting process, and for representing the architecture of the software system as a set of visual attributes without constraining the representation to any particular predefined architectural style. Embodiments of the invention advantageously apply multi-dimensional mapping techniques to software components to generate visual maps of the relationships and interactions among software components that could not be easily understood or assimilated if presented in a non-graphical (e.g., tabular) format.

Embodiments described are generally directed to a system and method for a multi-dimensional visualization of the architecture of software programs and operating systems. In one embodiment, multi-dimensional software architecture data, including attribute information indicative of a plurality of software components and a plurality of connections among the software components, is extracted from software source code. A graphical representation of the multi-dimensional architecture data is generated according to a data-feature mapping between the attribute information and visual features of the graphical representation. In one embodiment, selected attributes of multi-dimensional architectural data are mapped to a corresponding visual feature represented by a geometric object. In one embodiment, a geometric object (glyph) is generated for each data element (software component) of the multi-dimensional architecture data to convert the multi-dimensional architecture data into visual information.

BRIEF DESCRIPTION OF THE DRAWINGS

Embodiments of the invention are illustrated by way of example, and not by way of limitation, in the figures of the accompanying drawings in which like reference numerals refer to similar elements and in which:

FIG. 3 is a table illustrating multi-dimensional data;

FIG. 5 is a table illustrating a number of connectors associated with a select set of components of the exemplary operating system;

FIG. 6 is a cross-reference table illustrating the number of function calls between each of the components of FIG. 5 that reference global functions in the exemplary operating system;

DETAILED DESCRIPTION

Figure 1:
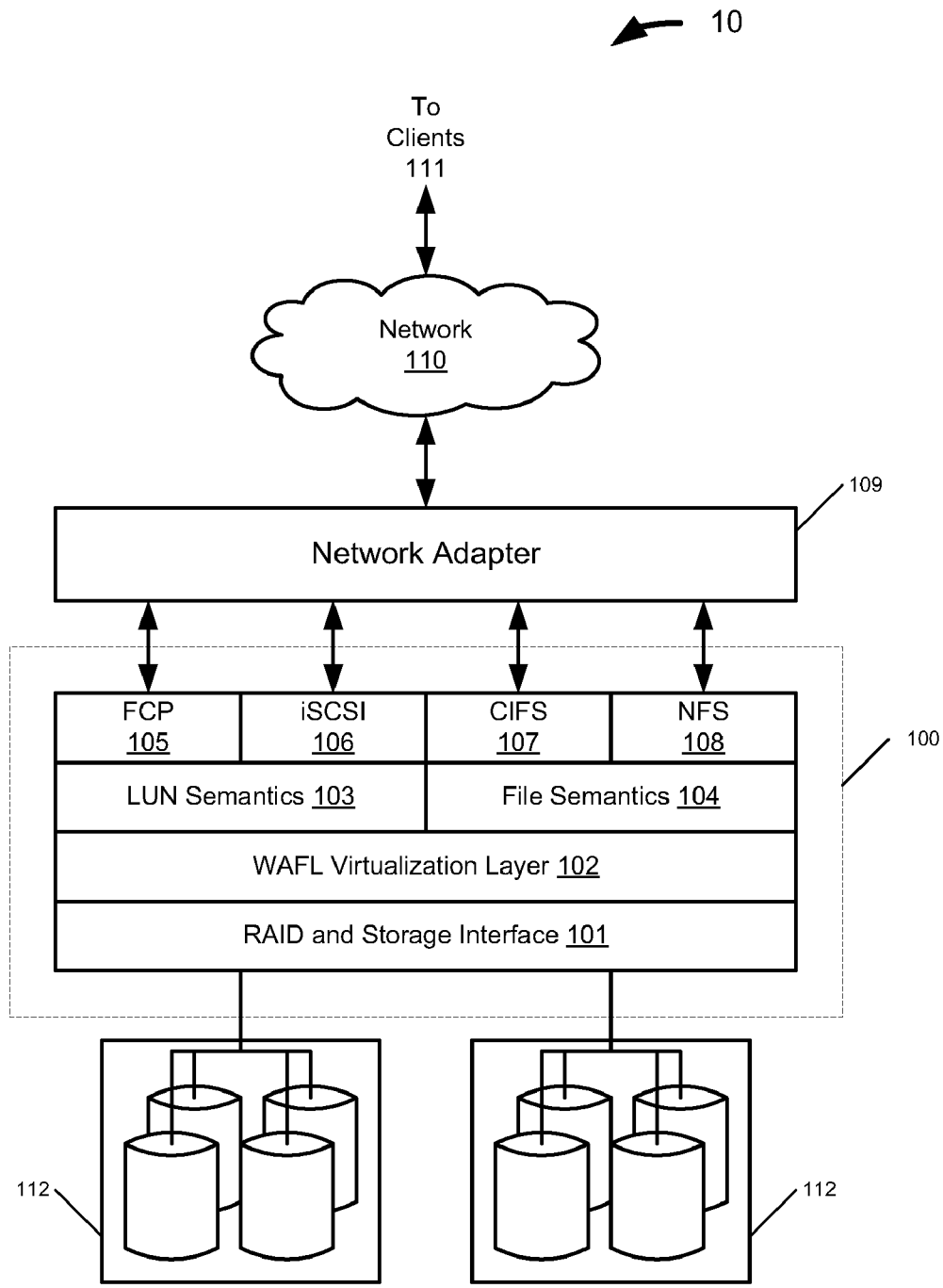
FIG. 1 is a block diagram illustrating a layered architecture representation of an exemplary operating system.

A tool for visualizing software architecture is described. As described in greater detail below, in certain embodiments, software source code is represented by the tool as visual information that allows a user to observe the architecture of a software operating system, such as a network storage operating system. As described herein the term "source code" refers to any type of symbolic language that may be used for computer programming. As described herein, "visualization" refers to the presentation of information in a pictorial form, such as a graphical representation. In one embodiment, a visualization tool enables viewers to visually analyze, explore, and compare the architecture of a software system in a manner that allows the user to rapidly and effectively understand and verify the operation of the system in a way that may not be possible if the source code data is viewed in a text format. Specifically, large amounts of text data may be more difficult to assimilate and decipher than a visual representation of the same data. The visualization tool can visualize a system's architecture along a two-dimensional (2D) grid, a 3D representation in a 2D rendering or other like visualization format.

As described herein, the term "glyph" refers to a geometric object that has one or more visual features that can be varied. The visual features may include, but not be limited to, spatial placement, color and texture properties to represent attributes of multi-dimensional software architecture data. A data-feature mapping can assign a selected attribute of multi-dimensional software architecture data to a visual feature represented by a glyph.

As described herein, multi-dimensional software architecture data can include a plurality of data elements. As described herein, a "data element" encodes a scalar attribute value for each attribute of multi-dimensional software architecture data that is selected for visualization. As also described herein, the term "attribute" refers to the information captured by a software debugging tool to provide a classification of software components of an operating system.

As described herein, each "visual feature" represented by a glyph includes a range of displayable values. The displayable range for the visual features of a glyph can be selected according to scalar attribute values encoded by a respective data element represented by the glyph. When shown together, the glyphs form a visualization that supports exploration of software architecture and facilitates discovery of relationships among software components that is not available in other canonical views such as those described above.

Embodiments and applications of the invention are described herein with respect to an exemplary storage operating system of a network storage server for convenience and ease of exposition. It will be appreciated that embodiments of the invention may be generally applied to the visualization of software architecture and are not limited to the exemplary embodiments provided herein.

At a highest operating level, the exemplary operating system implements the "server" part of a particular kind of client-server architecture used for data access in file format or as data blocks, where active data (i.e., data subject to read and write operations) is represented in logical data structures (logical buffer trees) that supports a write-anywhere file system implementation. The terms "non-preemptive," "threaded," "message-passing," "coarse-grained symmetric multi-processing (CSMP)" and "micro-kernel" can be used to explain how the operating system works internally.

Two styles of software architecture are routinely applied to storage operating systems: the layered model and the pipe and filter model. A layered system is organized hierarchically, each layer providing service to the layer above and serving as a client to the layer below. The connectors are defined by the protocols that determine how the layers will interact. Topological constraints include limiting interactions to adjacent layers. The most widely known examples of this kind of architectural style are layered communication protocols such as TCP/IP.

Layered Architecture

Layered systems have several desirable properties. They support design based on increasing levels of abstraction. Since each layer interacts with at most two other layers, changes can be contained. As long as the interfaces between layers remain constant, the individual layers themselves can be replaced or reused. However, not all systems are easily structured in a layered fashion and layering rules sometimes need to be broken to enhance performance.

FIG. 1 is a layered representation of the exemplary operating system 100 in the context of a storage server system 10. In FIG. 1, storage hardware 112 (e.g., a redundant array of independent disks, or RAID) is driven by a RAID and storage interface layer 101 at the bottom of the software stack. File and/or block access protocols at the top of the software stack provide access to a network 110 through a hardware network adapter 109. As illustrated in FIG. 1, these protocols include the Common Internet File System (CIFS) protocol 107 and the Network File System (NFS) protocol 108 for file level access, and the Small Computer Systems Interface (SCSI) protocol encapsulated over TCP (iSCSI) 106 and SCSI encapsulated over Fibre Channel Protocol (FCP) 105 for block level access. The file access protocols 107 and 108 interface with a file semantics layer 104 that translates the file access protocols into operating system (OS) specific file access commands. Similarly, a LUN (logical unit number) semantics layer 103 translates data block access protocols into OS specific data access commands. In the context of the exemplary operating system, a WAFL® (Write Anywhere File Layout system provided by Network Appliance of Sunnyvale, Calif.) virtualization layer 102 manages relationships between logical and physical storage locations.

A layered view is useful because it lists the major software components and shows how they interact. In particular, it displays the client-side data access protocols (CIFS, NFS, iSCSI and FCP described above) and the representation suggests that all these protocols are treated as peers. Multi-protocol support achieved in this fashion is a significant feature of the exemplary operating system, but it is an incomplete picture because many important parts of the operating system, such as platform software and kernel code, are missing. Platform software includes firmware, device drivers, an operating system and, typically, a graphical user interface which, in totality, allow a user to interact with the computer, its peripherals and backup and replication tools. The kernel is the central component of most operating systems, and is responsible for managing the system's resources and the communication between hardware and software components.

Pipe and Filter Architecture

In a pipe and filter style architecture, each component has a set of inputs and a set of outputs. A component reads streams of data on its inputs and produces streams of data on its outputs by applying a local transformation to the input. Hence, components are called filters and connectors, which serve as conduits for the data streams, are known as pipes. Examples of pipe and filter architectures are UNIX shell programs. Another well-known example is the traditional view of a compiler with stages for lexical analysis, parsing, semantic analysis, and code generation represented as a sequential pipeline. Pipe and filter systems have a number of useful properties. They allow the designer to understand the overall input/output behavior of a system as a simple composition of the behaviors of the individual filters. If filters are truly independent, they support reuse so that any two filters can be connected, provided they agree on the format of data being transmitted between them. They permit certain kinds of specialized analysis, such as throughput and deadlock analysis. Finally, they naturally support concurrent execution, so that different filters can run in parallel. However, pipe and filter systems are typically not good at handling interactive applications due to their transformational character.

Figure 2:
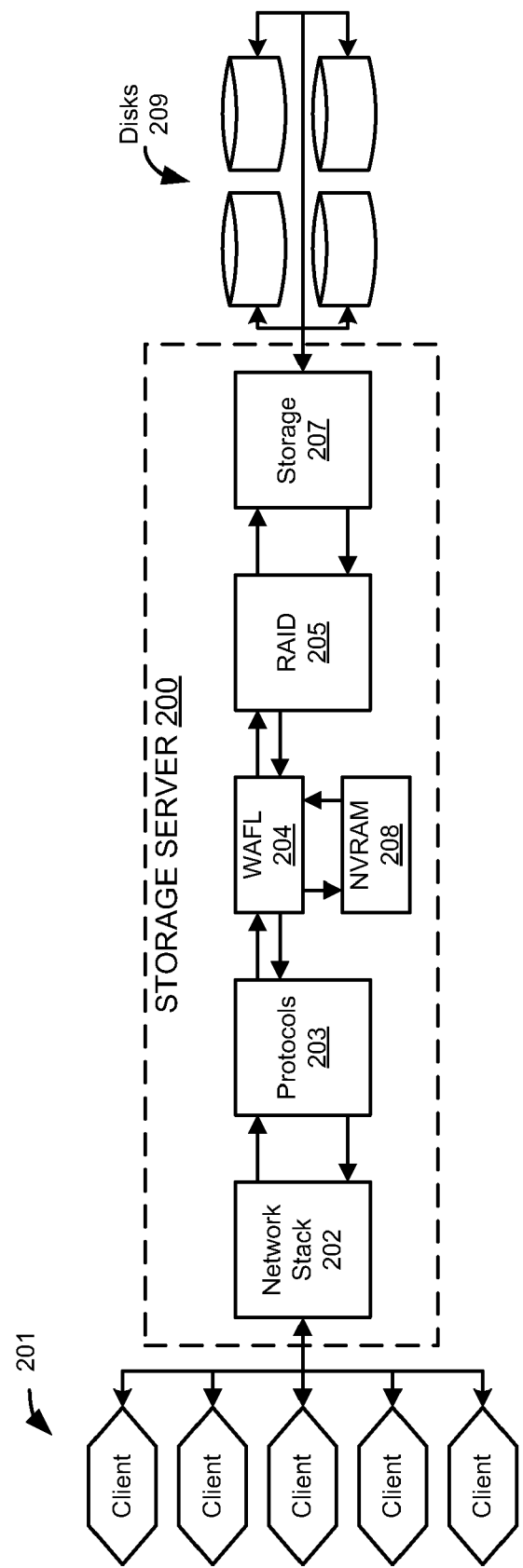
FIG. 2 is a block diagram illustrating a pipe and filter architecture representation of the exemplary operating system.

FIG. 2 is a pipe and filter representation 200 of the exemplary operating system. The filters are the named boxes and the arrows are the pipes. FIG. 2 illustrates data flowing in from the clients 201 to disks 209 and traversing multiple filters (network stack 202, protocols 203, WAFL 204, NVRAM (nonvolatile random access memory) 205, RAID 206 and storage 207) before returning to the clients.

The filters are implemented as packages of kernel threads and the pipes are implemented either as messages/signals or as direct procedure calls or by accesses to global data structures. This picture provides an understanding of the major software components in the exemplary operating system and how they relate to one another. As stated earlier, filters can run in parallel. In particular, the exemplary operating system makes use of this feature to implement CSMP. The architectural view of FIG. 2 may imply that all of the filters reside on a single hardware platform, but that is not necessarily true. In one embodiment of the exemplary operating system, some CSMP domains can be extracted to run on separate hardware platforms. For example, a storage server may include a separate N-(network) blade and D-(disk) blade (not shown). In such an embodiment, the N-blade is used to communicate with clients, while the D-blade includes the file system functionality and is used to communicate with the storage subsystem. The N-blade and D-blade communicate with each other using an internal protocol. Applying this type of implementation to the example of FIG. 2, the first two filters, Network Stack 202 and Protocols 203, may run in an N-blade, while the remaining filters may run in a D-blade. A pipe and filter view provides a useful picture of data flows in a software system, but it does not do a good job of showing all of the complexity of a network storage system (e.g., it does not capture the functionality of kernel code or platform software).

Multi-Dimensional Scaling

Multi-dimensional scaling (MDS) is a technique that provides visual representations of measures of relatedness (input proximities) among a set of objects (see, e.g., Forrest W. Young, "Multidimensional Scaling," in *Encyclopedia of Statistical Sciences*, vol. 5, John Wiley and Sons, 1985). The input proximities among the set of objects can be expressed as distances between points on a multi-dimensional map. The relationship between input proximities and the distances between points on the map can be positive or negative. In a positive relationship, a high input proximity between two objects in the set produces a close mapping between corresponding points, and vice versa. In a negative relationship, a high input proximity between two objects in the set produces a more distant mapping between corresponding points, and vice versa.

MDS finds a set of $n(n-1)/2$ vectors in a two-dimensional space that define distances among every pair of objects in a set of n objects, where the distance between each pair of objects corresponds as closely as possible to some function of the input proximities of the pairs of objects. The correspondence between the input proximities and the physical (Euclidean) distances of the objects is measured by a stress function (where low stress corresponds to high correlation). An algorithm for MDS may be expressed as:

1. Assign n points to arbitrary coordinates in the two-dimensional space.
2. Compute the $n(n-1)/2$ Euclidean distances between all pairs of points, to define a D (distance) matrix.
3. Compare the D matrix with an input proximity matrix I by evaluating a stress function. The smaller the value of the stress function, the greater the correspondence between the pairs of points.
4. Adjust the coordinates of each point in the direction that most reduces the stress function value.
5. Repeat steps 2 through 4 until the stress value does not get any lower.

The stress function represents a qualitative measure of fit ("goodness-of-fit") between the input proximity data and the distance data and can be quantified as a sum of squared distances between points in the two data sets. Mathematically, this relationship may be expressed as:

$$\phi = \Sigma [d_{ij} - f(\delta_{ij})]^2$$

where stands for the Euclidean distances between data points over all pairs of points ij, $\delta_{ij}$ stands for the input proximity between each pair of data objects ij. The expression $f(\delta_{ij})$ represents a transformation function of the input proximity data. Methods for minimizing the stress function $\phi$, such as successive relaxation and gradient search techniques, are known in the art and, accordingly, are not described in detail.

Figure 4:
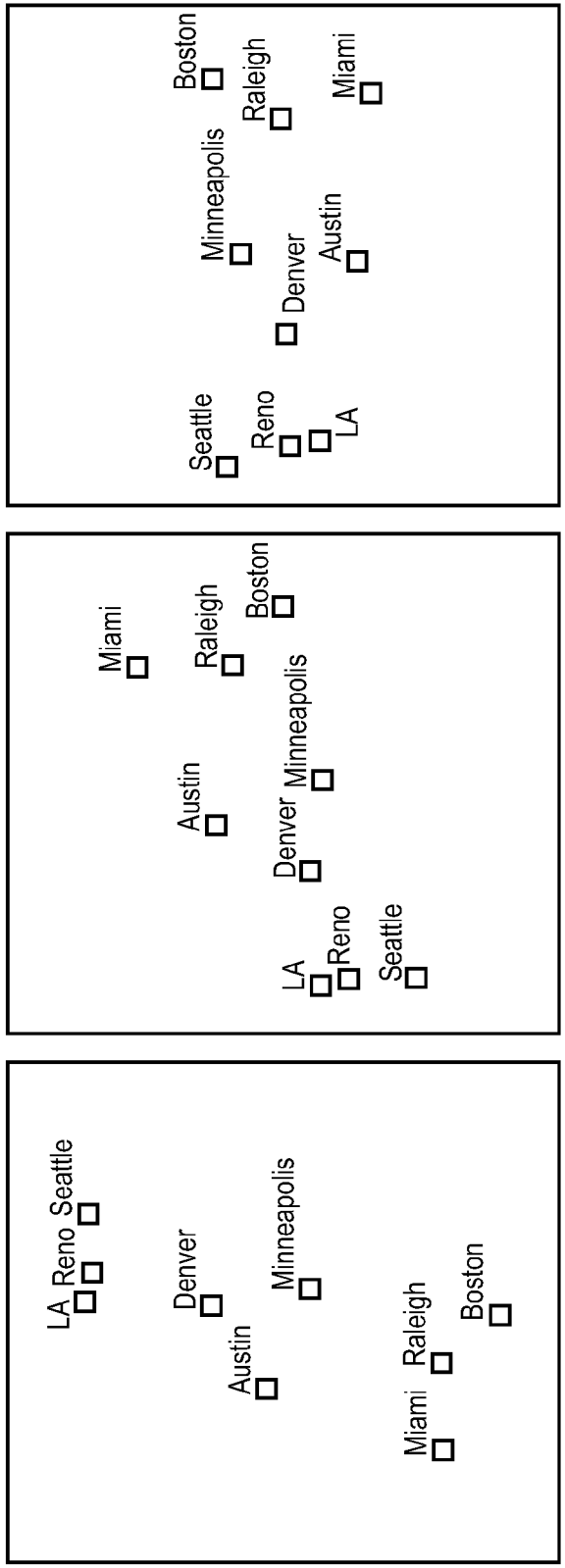
FIGS. 4A-4C are graphs illustrating a multi-dimensional scaling of the data of FIG. 3A.

The following example demonstrates an application of MDS. FIG. 3 is a table listing the distances between nine major US cities. FIGS. 4A through 4C illustrate three different views generated with three different starting positions for the cities before running the MDS algorithm and minimizing the stress function. Because the data contains only distances and not directions, the orientations of the outcomes will vary. However, any of the views of FIGS. 4A-4C can be transformed into any of the other views by rotation and/or translation operations. FIG. 4C is a topographically accurate representation of the nine cities.

As noted above, complex software systems do not, in general, have a detailed architectural design document and cannot be completely represented by a standard Architecture Description Language. In one embodiment of the present invention, a solution to this limitation is the extraction of a software architectural view of an operating system by using the software source code of the operating system to self-define its architecture and using MDS visualization tools to represent the architecture.

Identifying Software Components

As described above, all software architectural styles include components and connectors. In order to generate a complete representation of an operating system, for example, it is useful to first decide what components to use and how to connect them. In one embodiment, a software debugging tool (e.g., Bugzilla, an open source debugging tool available at http://www.bugzilla.org/) may be used to identify and extract components from software source code along heuristic architectural boundaries which are defined by the components. Software bugs may be characterized as to a type, such as hardware, software, etc., and a subtype associated with a specific software module (where a module is defined as a grouping of related software code that is associated with a defined function). Every line of code in an OS can be associated with a software type and subtype based on the classifications of a bug-reporting tool. As a result, all of the code of an entire operating system can be partitioned into software subtypes that directly correspond to the classifications of a bug-reporting tool.

The selection of software components to be used for multi-dimensional scaling and visualization may be influenced by a particular objective, such as understanding the architecture of platform software. Using this objective with respect to the exemplary operating system, a first step in the analysis includes listing all software subtypes (as listed by the bug reporting tool), and then selecting only those subtypes that represent OS code running on hardware platforms. Closely related subtypes with overlapping code can be grouped together to limit the total number of software components in the analysis. For the exemplary operating system, this definition/selection process results in a set of 38 software components in seven functional groups associated with replication, administration, file system management, network management & control, RAID management & control, kernel software and driver & platform software.

For the purposes of the present description, a detailed understanding of the functionality of these 38 components need not be understood in detail. That is, from a system architecture point of view, the level of connection between and among the components is relevant. The components could just as well be identified by the numbers 1-38.

Usually, there is a one-to-one mapping between software subtypes in a debugging tool and engineering development teams, and most engineering development teams work on code that resides in a small set of subdirectories in a code tree (a directory structure used for source code configuration management). Therefore, code partitioning using software subtypes lends itself naturally to code isolation, because the code tree provides a natural mapping of components to lines of code.

An analysis of the software components can be performed by examining the code corresponding to each component in order to derive an architectural view. In one embodiment, the analysis may proceed by 1) extracting a list of symbols, including functions and global variables exported by each software component, and 2) creating a symbol cross-reference table that lists the number of references from each component to every other component.

The extraction of global functions and variables from source code may be accomplished, for example, with a commercially available reverse engineering tool such as Understand for C++, available from Scientific Toolworks, Inc. of St. George, Utah. This tool can extract the functions, global variables and macros (subroutines) defined within each file in the source code tree (e.g., to an html document), without any prior knowledge of the software components, by simply mapping symbols to filenames. The output so obtained can be organized (e.g., by using Perl® scripts to extract the symbols and symbol cross-references in the above html output) to create a new mapping of symbols to software components as illustrated in the table of FIG. 5 for a representative subset of the 38 components in the exemplary operating system. The table in FIG. 5 lists attributes including the number of files, threads, global variables, global functions and local functions associated with each of 17 selected software components defined within the exemplary operating system. Each of the global functions associated with each software component can be classified as a call to one component from another, or as a call from one component to another. This information can be used to generate a global function cross-reference table, as illustrated in the exemplary table 600 of FIG. 6 for the 17 selected software components of table 500 of FIG. 5.

Building Cross-Reference Tables for Software Components

Each row in table 600 displays the number of function calls referencing global functions in the component named in the row from the component named in the column. Thus, looking at the first row, there are 10151 function calls from component admin into component admin; these are self-referential calls. There are 154 calls from component autosupport into component admin. A close inspection of these global function cross references reveals the following:

In almost every row, self-references comprise the maximum number of calls, because most global functions are exported for intra-component communication, not inter-component communication.

The matrix is sparse; i.e., in most of the rows, the number of columns with zero calls exceeds the number of non-zero calls. This indicates that most components talk to just a few other components. This suggests that the architecture lends itself to a layered representation. But the architecture is not strictly layered because most components communicate with more than two other components.

The filerview component appears to be isolated with no function calls either going into it or emanating from it. This is an artifact of the filerview component being written in Java in the exemplary operating system, and Java code is not processed by the Understand for C++ tool. In contrast, the java component (see FIG. 5) has a lot of Java code that is not included in the function call references, but there is a substantial amount of C code in the java component, which is included. For the purpose of visualizing architecture, the exclusion of Java code does not alter the overall view because a vast majority of the function calls in the exemplary operating system are written in C, not in Java.

A few components, notably admin, cmds, kernel and platform interact with most of the other software components.

Kernel software is heavily used by all other components. This suggests that the services provided by the kernel component are "general purpose" and required by all other components.

While the embodiment described above uses only global function (a function that can be called by any software module) and global variable (a variable that can be used by any software module) cross-references, other embodiments are contemplated that exploit other ways in which software components can interact with one another (e.g., via macros).

As described above, embodiments of the visualization tool described herein can be applied to the visualization of architectural relationships of platform software to other software components. Referring again to FIG. 6, row 601 labeled "platform" represents the number of global function calls from various other software components into platform software. The column labeled "platform" can be eliminated from this row because intra-component dependencies are not relevant to the high-level architecture. Any components that do not call any of the global functions exported by the platform software can be eliminated. The remaining global function cross-references can be represented as a bar graph, as illustrated in FIG. 7.

Figure 7:
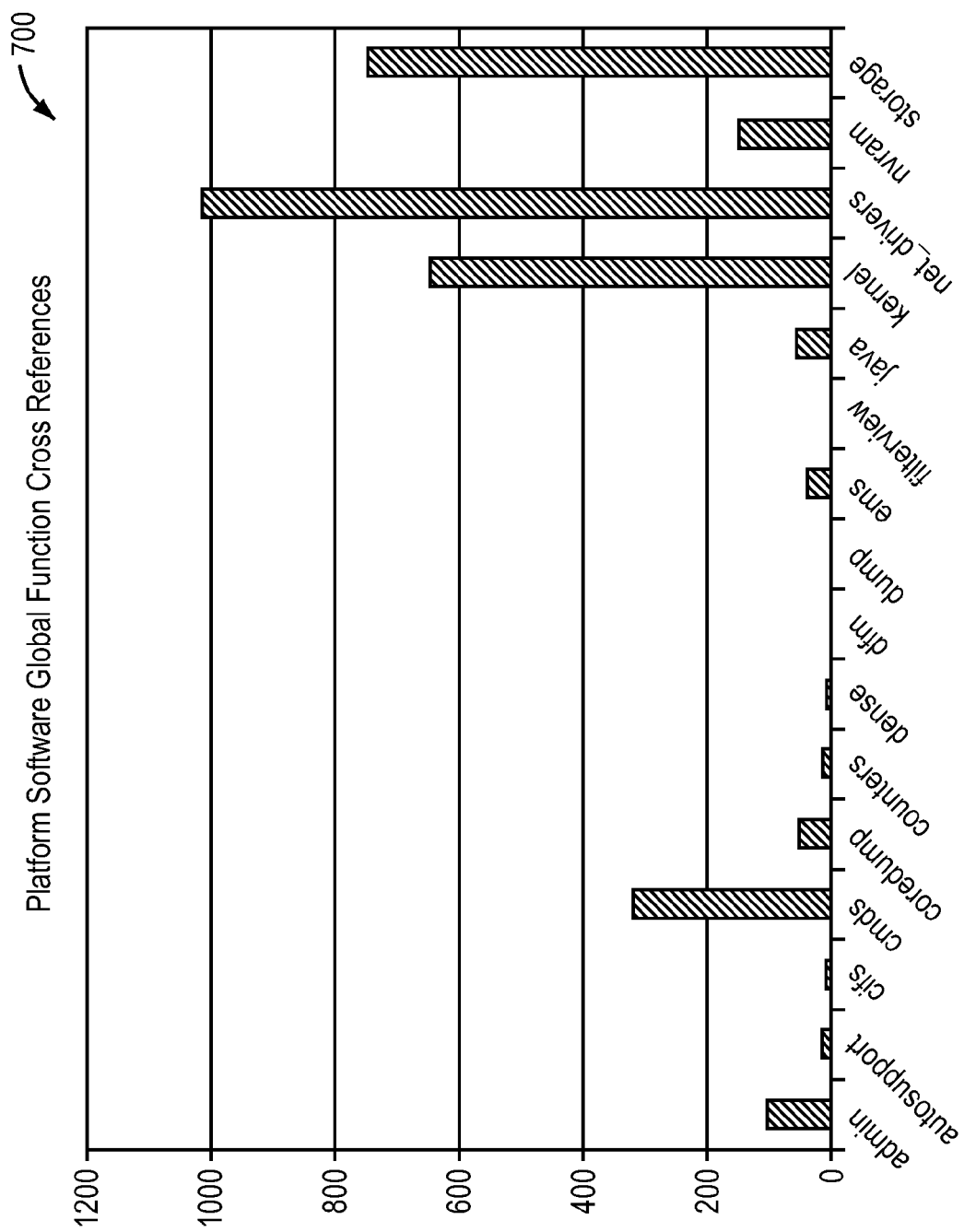
FIG. 7 is a graph illustrating the number of function calls in each of the components of FIG. 5 that reference global functions in the platform software component of the exemplary operating system.

With reference to FIG. 7, if it is assumed that closely related components have more interaction with one another than components that are less closely related, it can be concluded that the cmds, kernel, network drivers and storage software components are very closely related to platform software. This is a logical result, since these components have significant interaction with hardware, and platform software can be considered to be a conduit for communicating with hardware. Another component that is very closely related to platform software is nvram. This component does not appear, at first glance, to be closely related to platform software because the number of global function cross references into platform software is not very large compared with the other components listed above. However, examining the row that corresponds to nvram, it can be seen that this component is relatively small in size and the number of references to platform software is large as a percentage of all references from this component because nvram also communicates with hardware.

Now with reference to column 602 labeled "platform" in FIG. 6. This column represents the number of global function references from platform software into various other components and shows a reverse dependency relationship between platform software and various other components. Extending the logic applied to the row labeled "platform" to the column labeled "platform", it can be seen that platform software depends primarily on components admin, cmds, kernel, storage, network drivers and nvram. This set of components is identical to the set of components extracted by examining the row labeled "platform" in FIG. 6. This suggests that platform software belongs to a set of closely related components that all communicate with one another and which cannot be accurately described by a layered architectural representation.

The data representation of FIG. 6 may be replicated with respect to other parametric relationships between software components. For example, in addition to a table of global function cross-references, such as table 600, cross-reference tables may be created for global variables, shared files and number of threads.

Visualizing Software Architecture

In visualizing data, the properties of the data and the visual features used to represent the data elements should be chosen to produce an effective result. Characteristics to control may include: 1) dimensionality (number of attributes in the dataset), 2) number of elements, 3) visual-feature salience (strengths and limitations that make the feature suitable for certain types of data attributes and analysis tasks), and 4) visual interference (i.e., different visual features can interact with one another, producing visual interference that can limit the amount of visual information available to an observer).

As discussed above, the global functions cross-reference table 600 illustrated in FIG. 6 is only one of several ways to extract data. Other options for quantifying levels of connection include a global variables cross-reference table, a shared thread cross-reference table, a shared file cross-reference table and a "distance from hardware" parameter based on threshold levels of the other connection parameters.

Data-Feature Mapping

Figure 8:
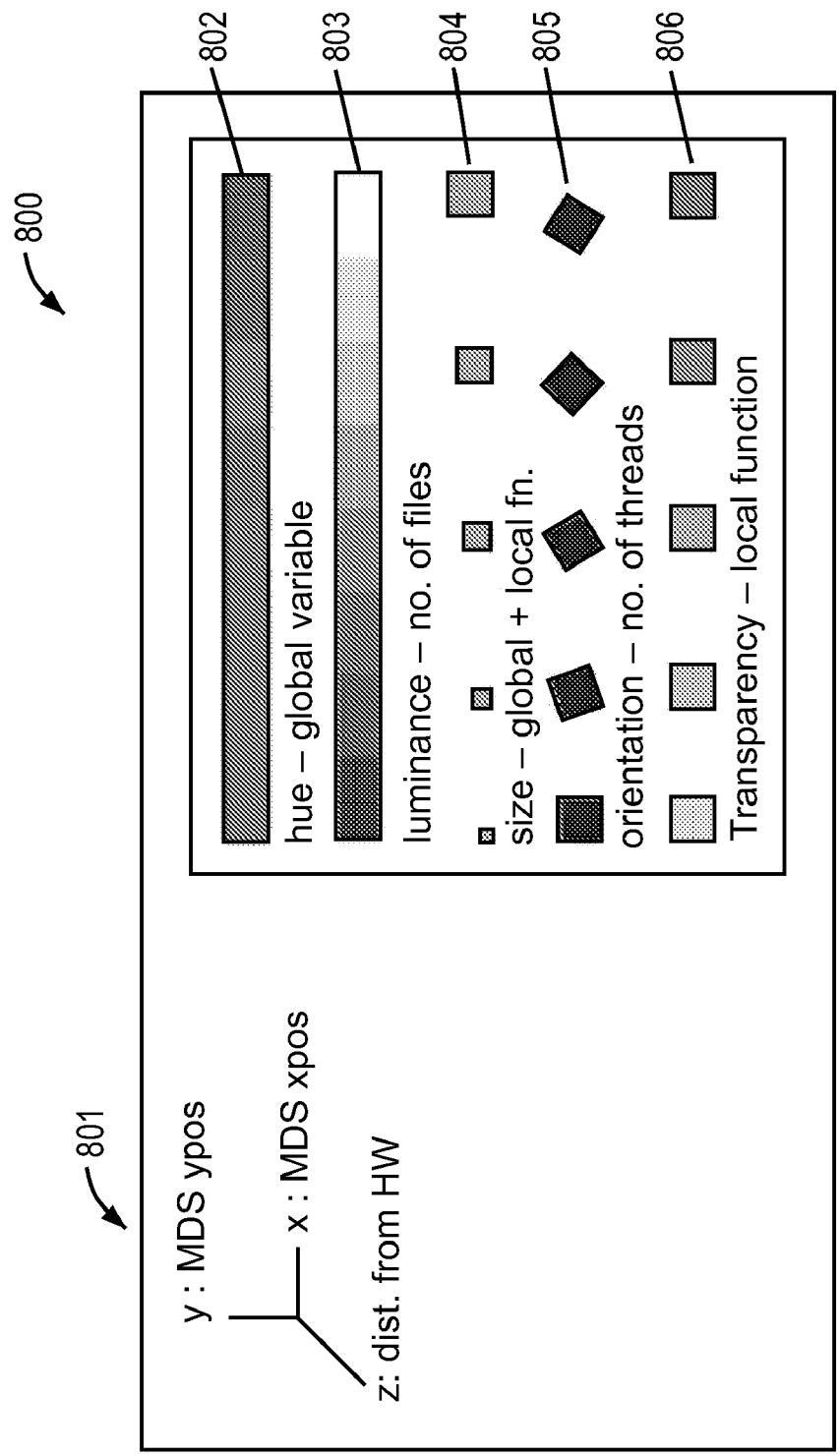
FIG. 8 illustrates an example of data-feature mapping in one embodiment.

Three-dimensional geometric objects known as "glyphs" can be used to provide a visual representation of the architectural parameters described herein. FIG. 8 illustrates one exemplary glyph visualization scheme 800. Visual parameters such as the variation of spatial position (x position, y position) in Cartesian coordinate system 801, color (hue 802, luminance 803), texture (size 804, orientation 805, height (z dimension) in coordinate system 801 and transparency 806), may be used to represent attribute values of a software component. Hue ranges from red for the lowest number to blue for the highest number. Luminance ranges from darker for lower numbers to brighter for higher numbers. Larger size represents higher numbers. Orientation ranges from 0 degrees to 85 degrees, such that more the tilt the higher the value. Less transparent represents higher numbers and more transparent represent lower numbers. Taller height represents higher numbers. The most significant attributes should be mapped to the most salient features and secondary data should not be visualized in a way that would lead to visual interference.

Visualization of the Data

Figure 9A:
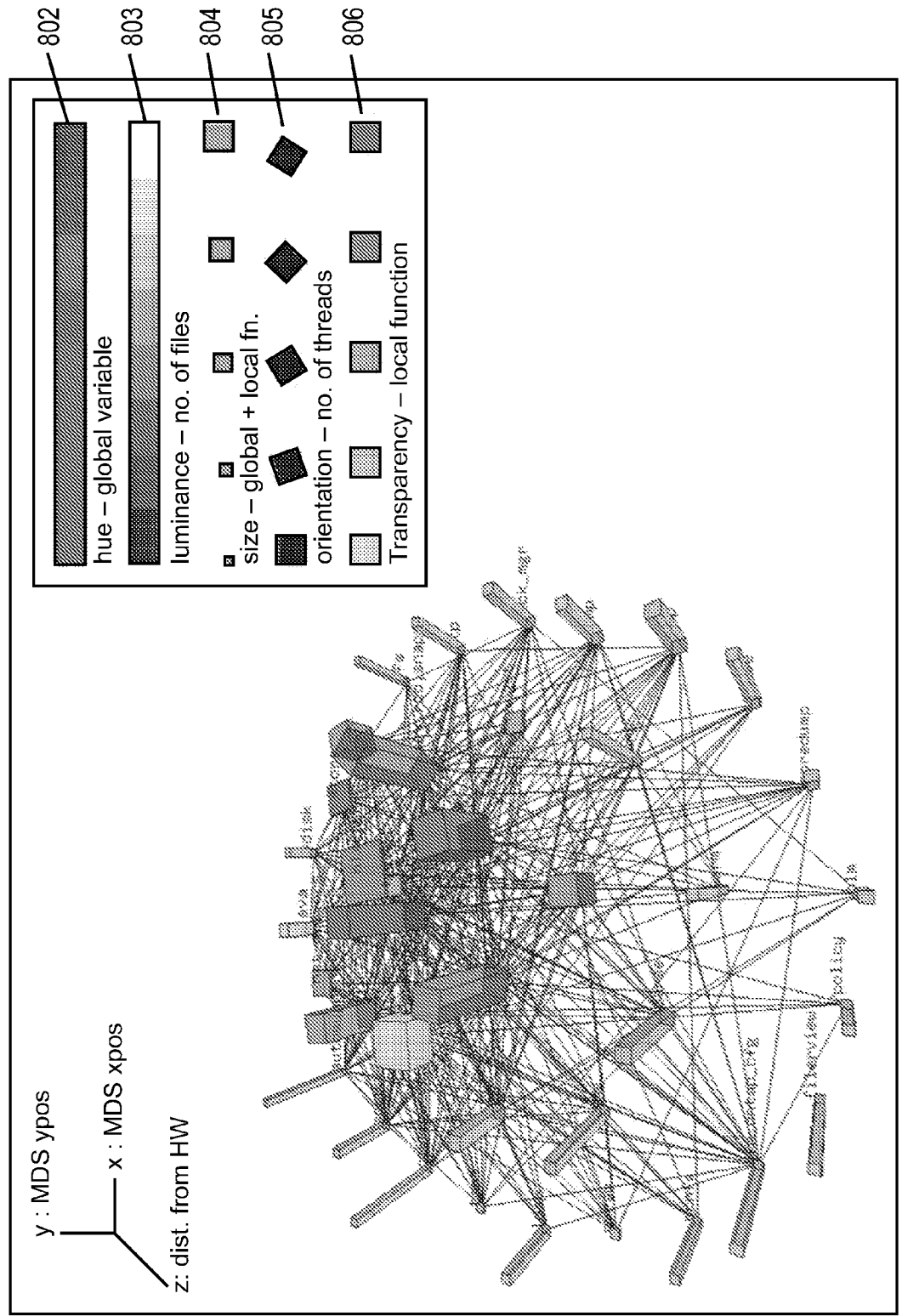
FIG. 9A is a visualization of the global cross-reference table of FIG. 6 in one embodiment.
Figure 9B:
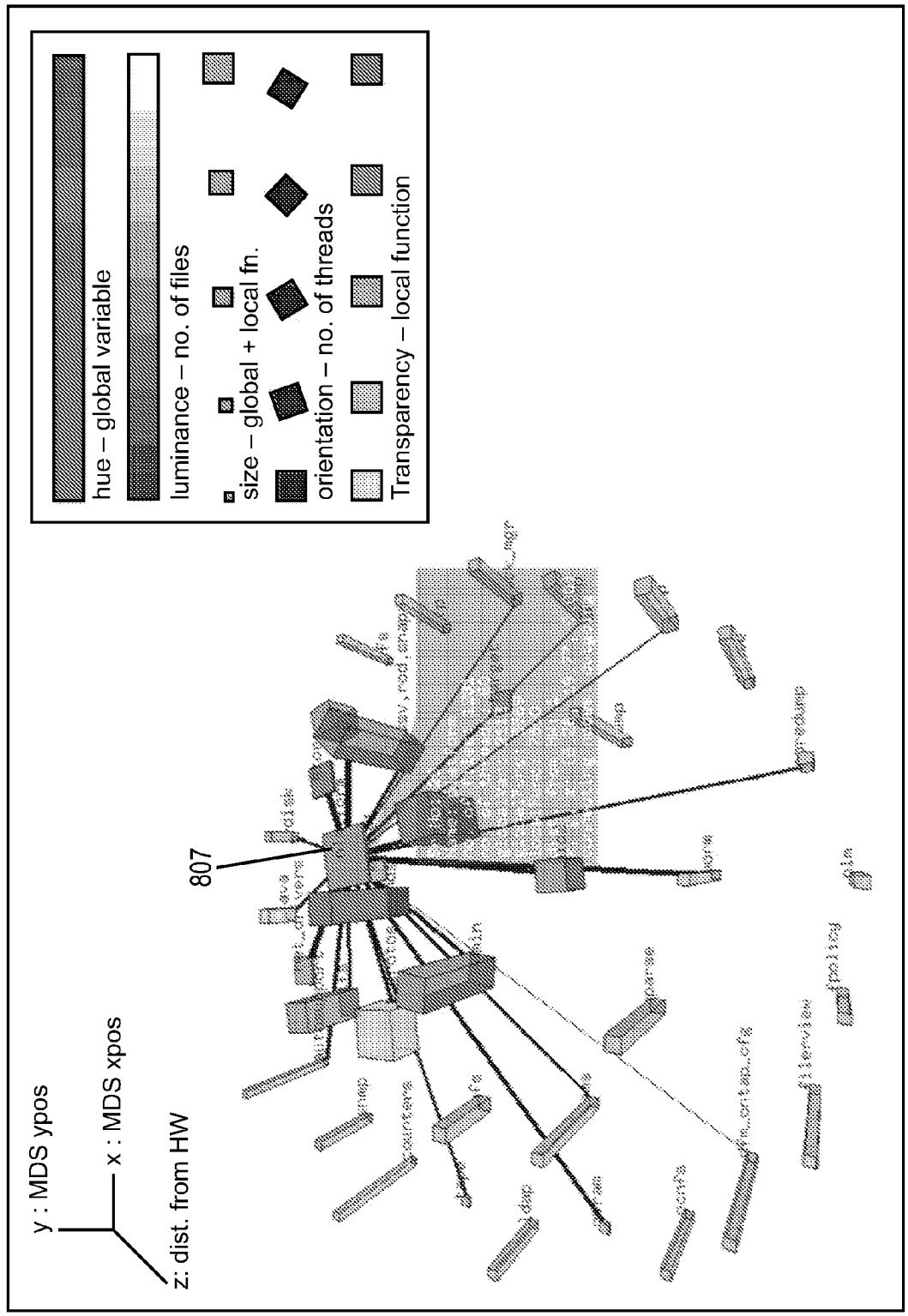
FIG. 9B is a visualization of the of outgoing connections from a selected component node of FIG. 9A in one embodiment.
Figure 9C:
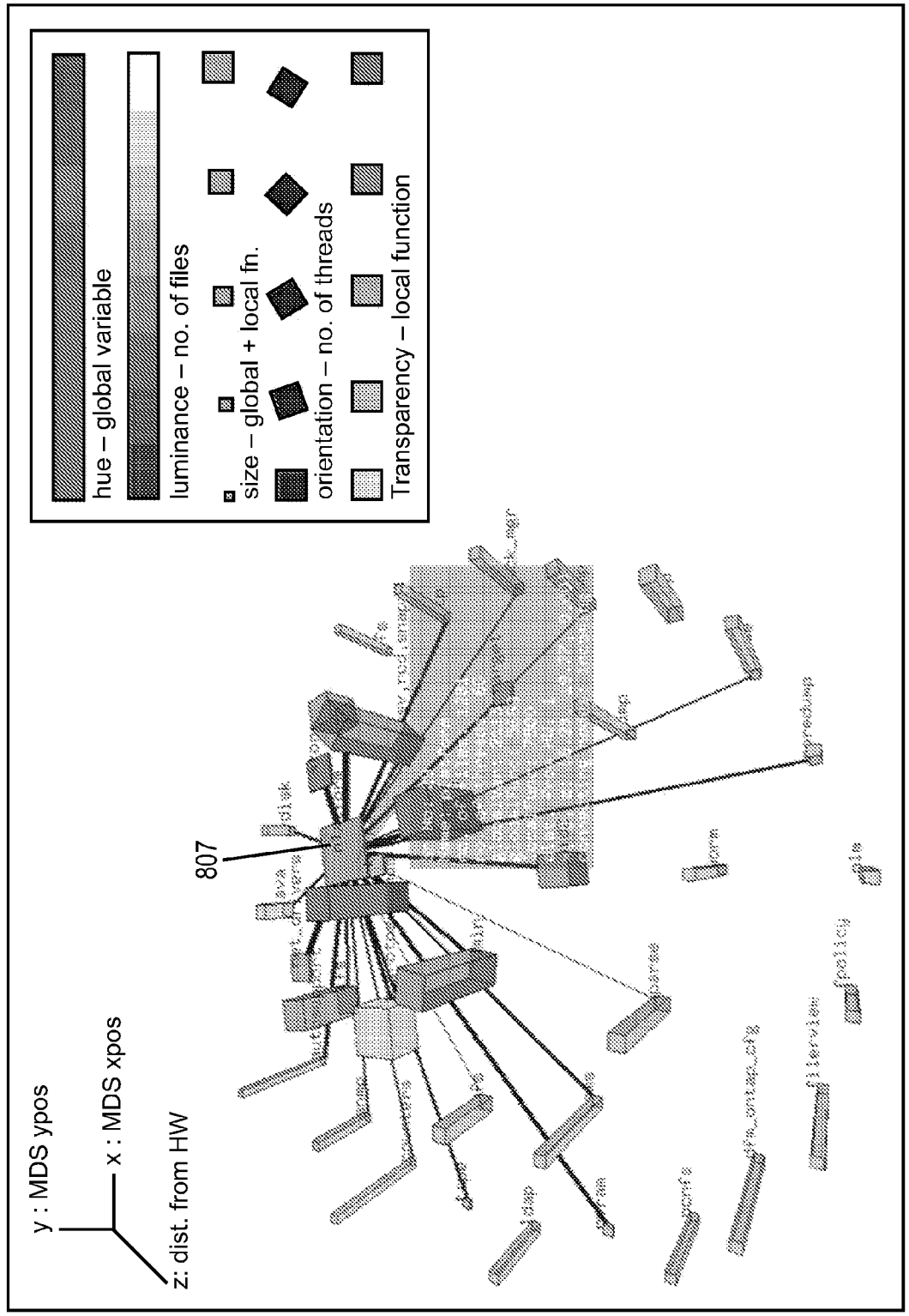
FIG. 9C is a visualization of the incoming connections to the selected component node of FIG. 9A in one embodiment.

FIG. 9A illustrates an exemplary visualization of the connections between all 38 components of the exemplary operating system, after MDS analysis, applying the glyph visualization scheme of FIG. 8. In FIG. 9A, spatial position and line thickness represent the number of global function references between connecting software components. The number of global variables referenced in each software component is mapped to hue parameter 802 (it will be appreciated that hue cannot be illustrated in the grey scale figures, here, but in practice may be represented in color illustrations or on a color display for example). The number of files in each component is mapped to luminance parameter 803 (e.g., brighter for the higher numbers to darker for lower number). The number of global and local functions referenced in each software component is mapped to size parameter 804 (e.g., larger for higher numbers). The number of local functions is mapped to transparency parameter 806 (e.g., more transparent for lower numbers and less transparent for higher numbers). The number of threads supported by each software components is mapped to orientation parameter 805 (e.g., more tilted for higher values) and the distance from hardware is mapped to height (e.g., taller for greater distance). As noted above in the discussion of MDS, the distance between data points is inversely related to connection level in the case of software components, and that relationship is illustrated in the separation of components in the visualization of FIG. 9A.

Where the visualization in FIG. 9A illustrates the total global function cross-reference connections between all of the software components of the exemplary operating system, FIG. 9B illustrates only the outgoing connections from software component platform 807 (from column 602 of FIG. 6). FIG. 9C illustrates the incoming connections from the software component platform 807 (from row 601 of FIG. 6).

Figure 10A:
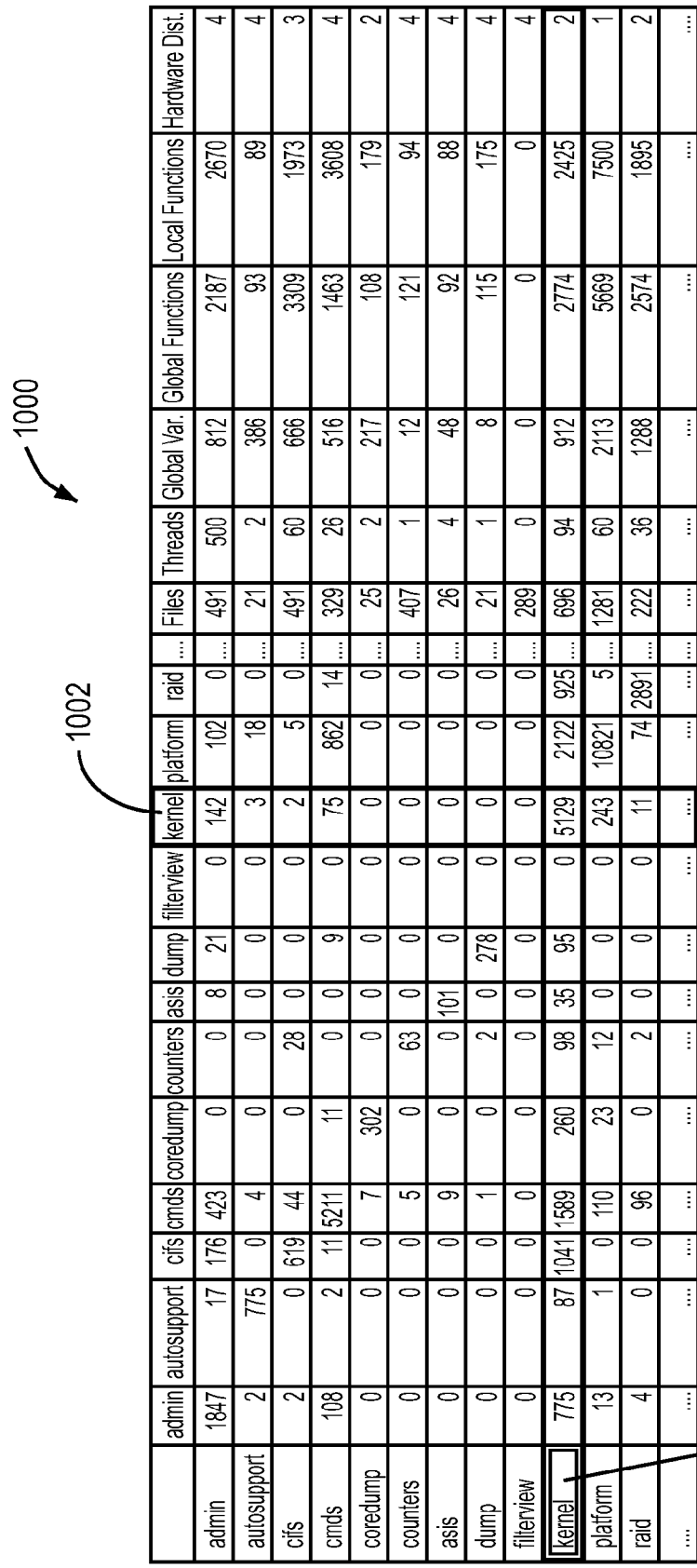
FIG. 10A is a cross-reference table illustrating the architectural relationships among another selected subset of components of the exemplary operating system.

It will be appreciated that the visualization tool described herein may be used to visualize software architecture from a variety of perspectives. For example, a system architect or programmer may want to understand the relationship between the kernel software component and other selected components of the operating system. FIG. 10A is a table 1000 listing attributes and global variable cross-references for a selected subset of 12 software components including admin, autosupport, cifs, cmds, coredump, counters, asis, dump, filerview kernel, platform and raid.

Figure 10B:
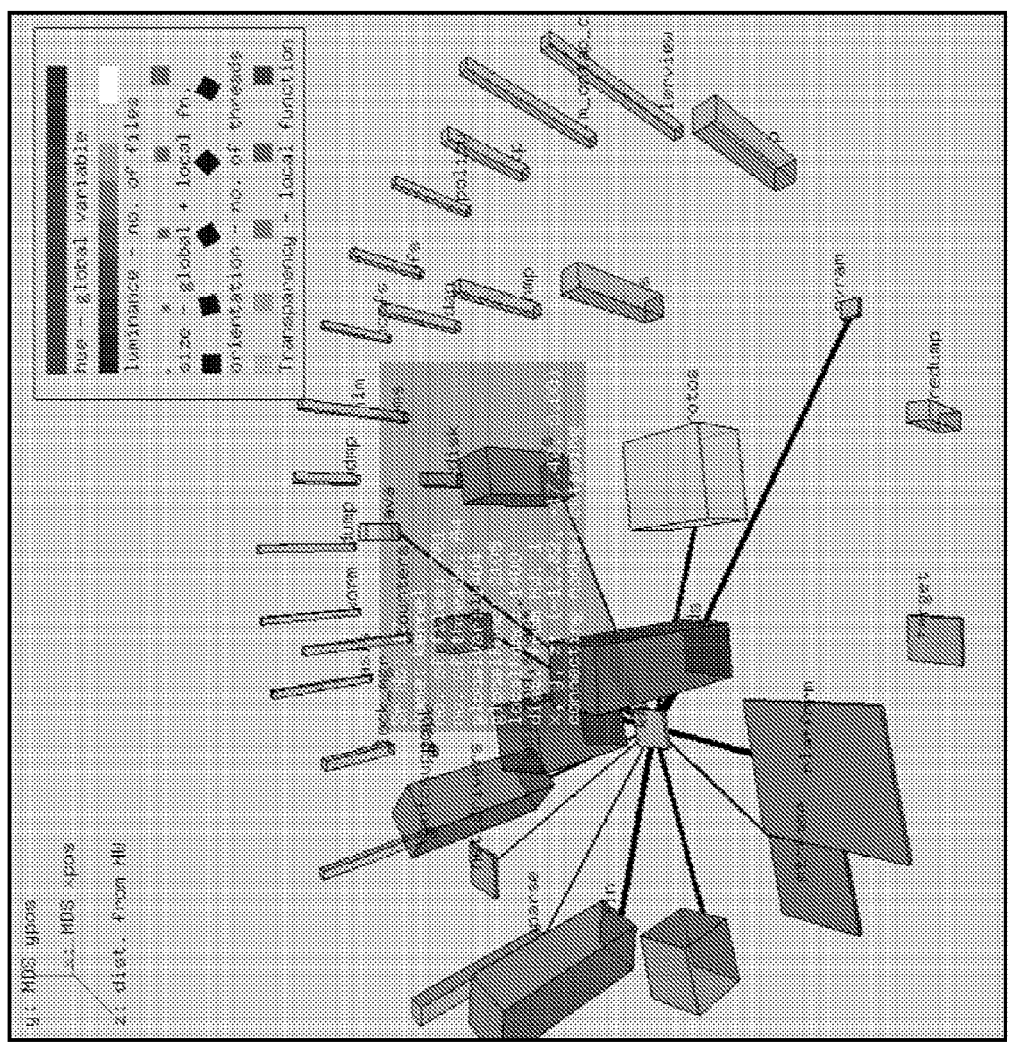
FIG. 10B is a visualization of the global cross-reference table of FIG. 6 for outgoing connections from another selected component node in one embodiment.
Figure 10C:
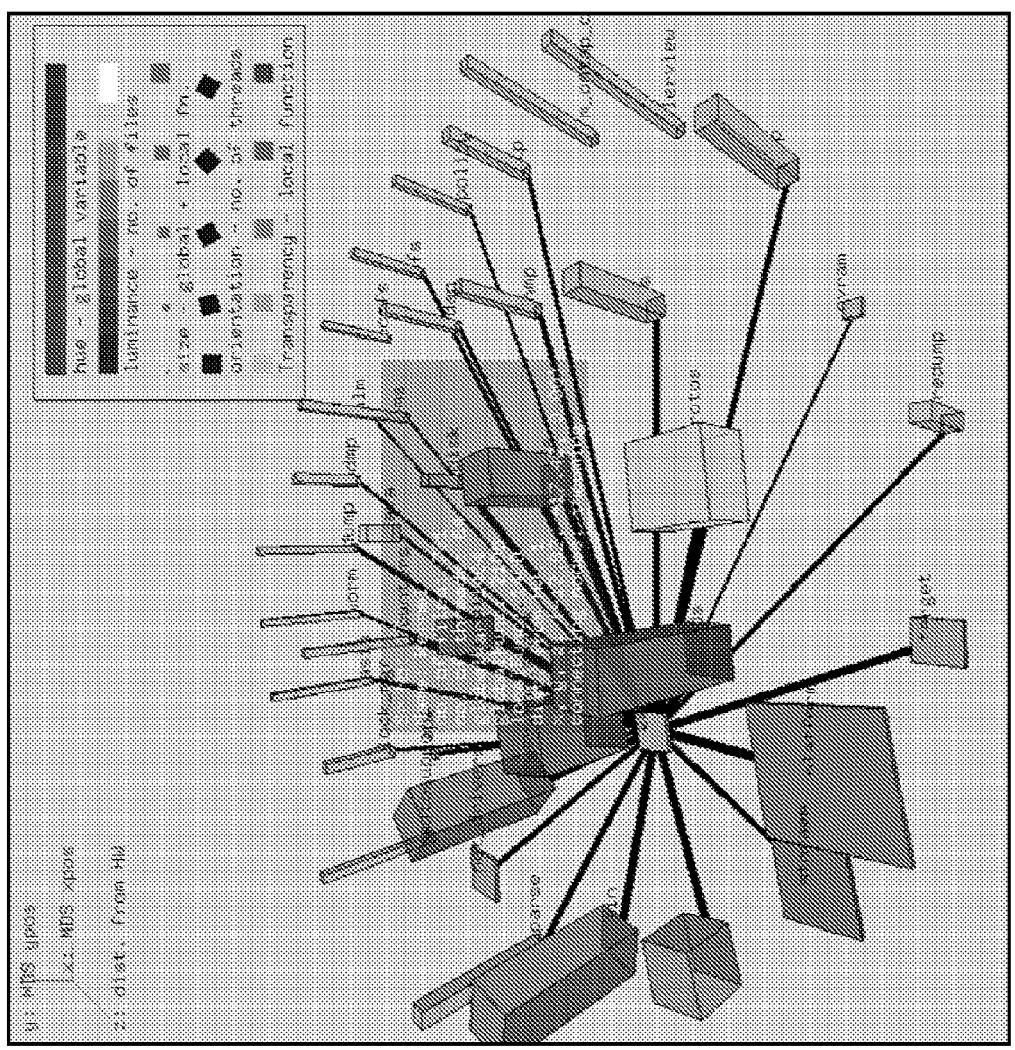
FIG. 10C is a visualization of the global cross-reference table of FIG. 6 for incoming connections to the other selected component node of FIG. 10A in one embodiment.

FIG. 10B is a visualization of the outgoing global variable references from component kernel (from column 1001 of FIG. 10) to the 11 other selected components. FIG. 10C is a visualization of the incoming global variable references to component kernel (from row 1002 of FIG. 10) from the 11 other selected components. FIGS. 10B and 10C illustrate that the kernel component is central to the architecture because it provides common services to all the other selected components. This is evident from the fact that there are many more incoming connections in FIG. 10C than outgoing connections in FIG. 10B.

Figure 11A:
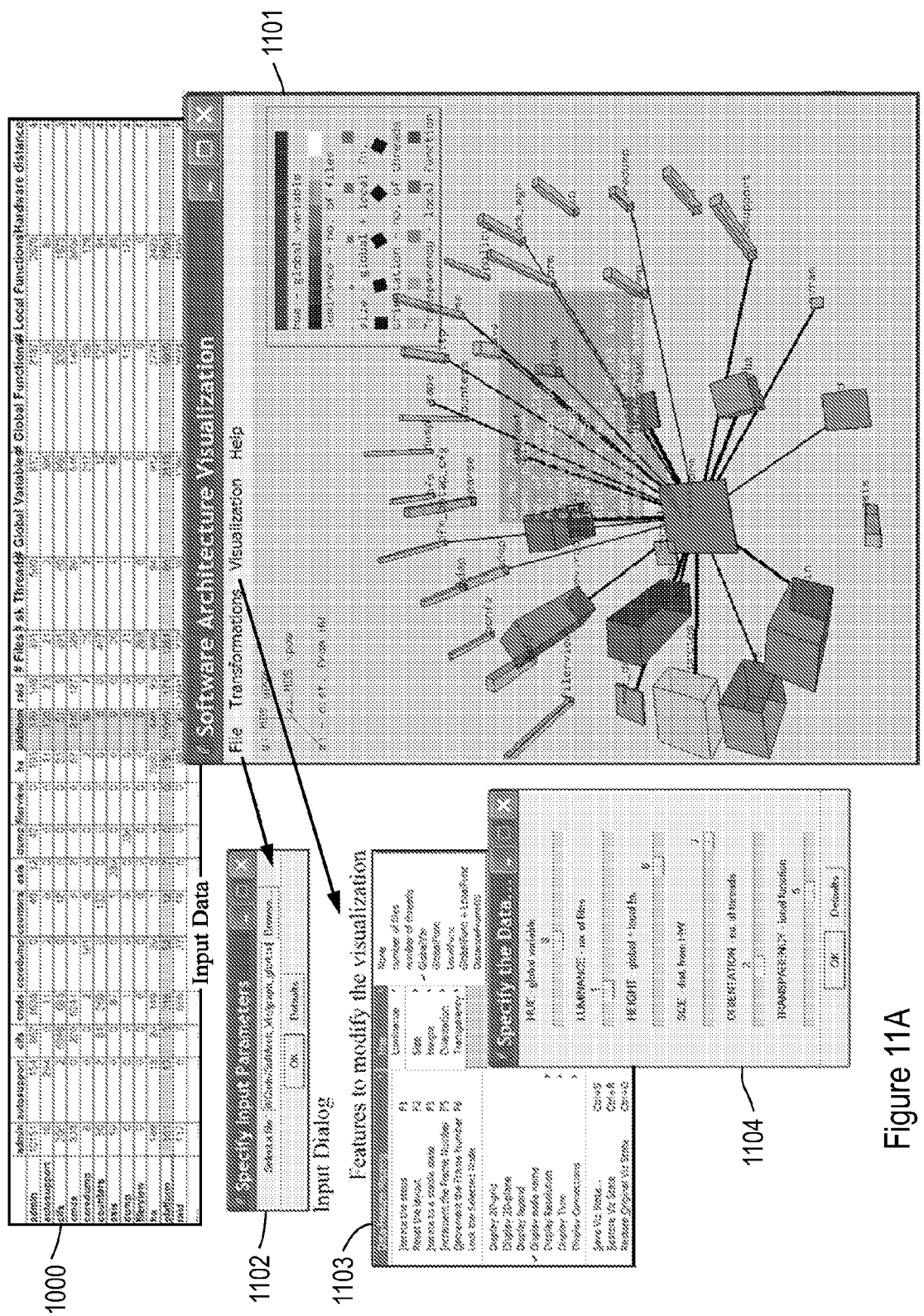
FIG. 11A is a graphic illustration of the steps for generating a visualization of software architecture in one embodiment.

FIG. 11A is an exemplary illustration of a user interface for generating architecture visualizations with the visualization tool described herein in one embodiment. The source data for the visualization illustrated in FIG. 11 is the attribute and global variable cross-reference table 1000 described above, including the selected subset of software components. In one embodiment, a user interface includes a visualization window 1101. Visualization window 1101 includes an input dialog box 1102 to select a data file such as that represented by data table 1000. Visualization window 1101 also includes a visual mapping list box 1103 that can be used to make associations between data attributes and visual features as described above, and data-feature mapping sliders 1104 to allow a user to customize the data-feature mapping parameters.

Figure 11B:
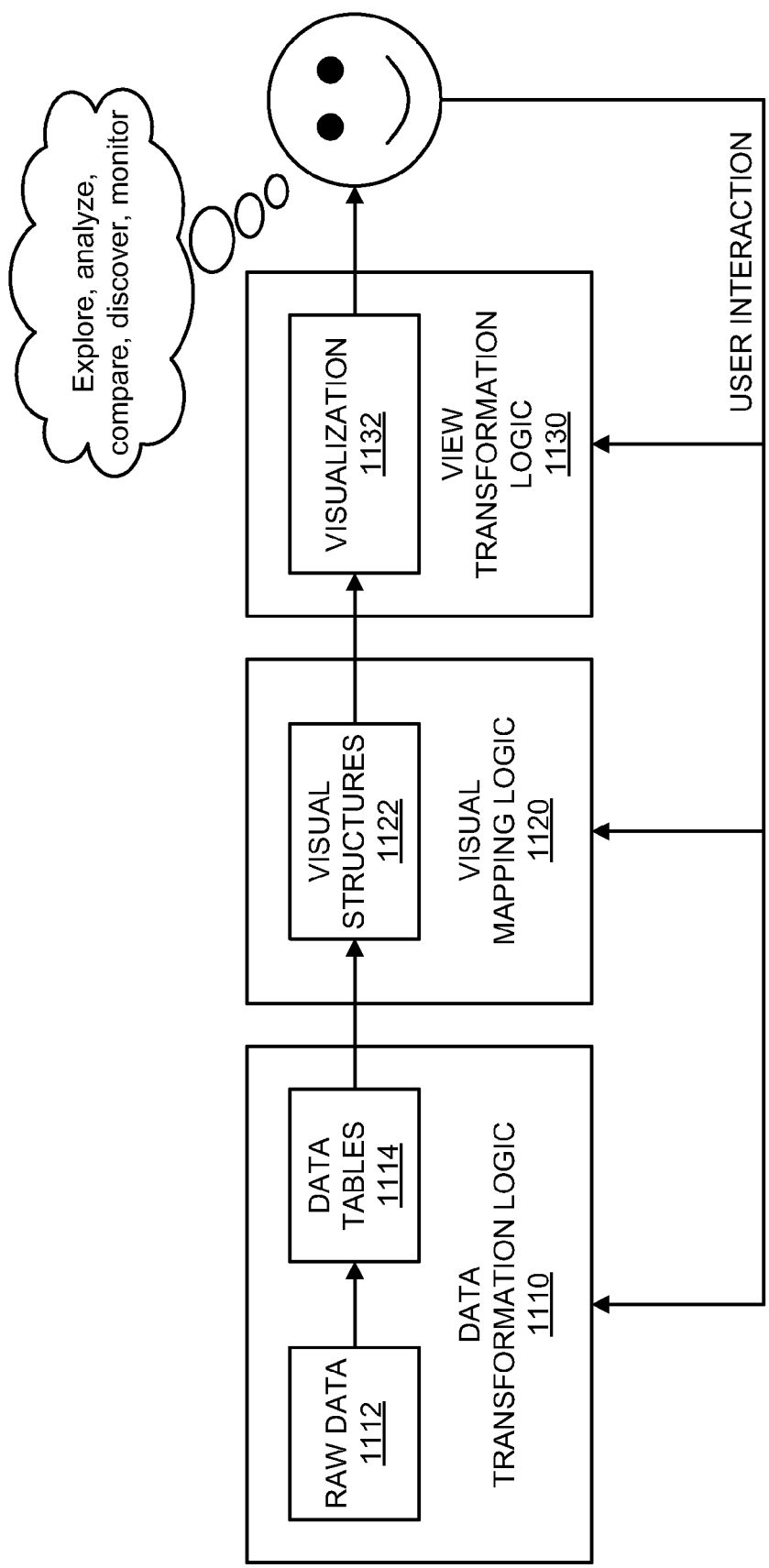
FIG. 11B is a functional block diagram illustrating one embodiment of a visualization tool.

FIG. 11B is a functional block diagram 1100 of the visualization tool described herein. In one embodiment, the visualization tool includes data transformation logic 1110 to convert raw data 1112 (e.g., software source code) into attribute and cross-reference data tables 1114 (e.g., data tables 600, 1000). The visualization tool also includes visual mapping logic 1120 to provide a data-feature mapping for converting data tables 1114 into visual structures 1122 (i.e., glyphs). The visualization tool also includes view transformation logic 1130 to provide visualizations 1132 (e.g., visualization 1101). The tool provides information respecting software architecture that a user may use to interactively explore, analyze, compare, discover and monitor software architecture.

Figure 12:
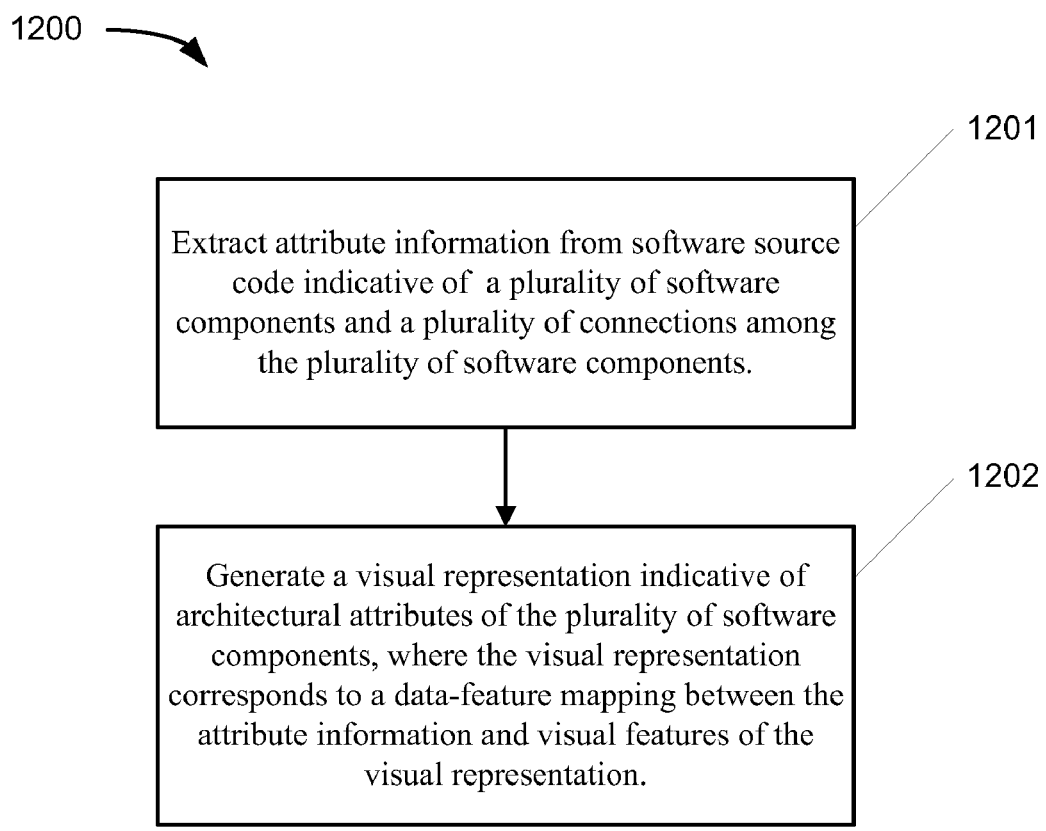
FIG. 12 is a flowchart illustrating a method to visualize software architecture in one embodiment.

FIG. 12 is a flowchart illustrating a method 1200 for architecture visualization in one embodiment. Method 1200 may include: extracting attribute information from software source code indicative of a plurality of software components and a plurality of connections among the software components (operation 1201); and generating a graphical representation indicative of architectural attributes of the plurality of software components, where the graphical representation corresponds to a data-feature mapping between the attribute information and visual features of the graphical representation (operation 1202).

Figure 13:
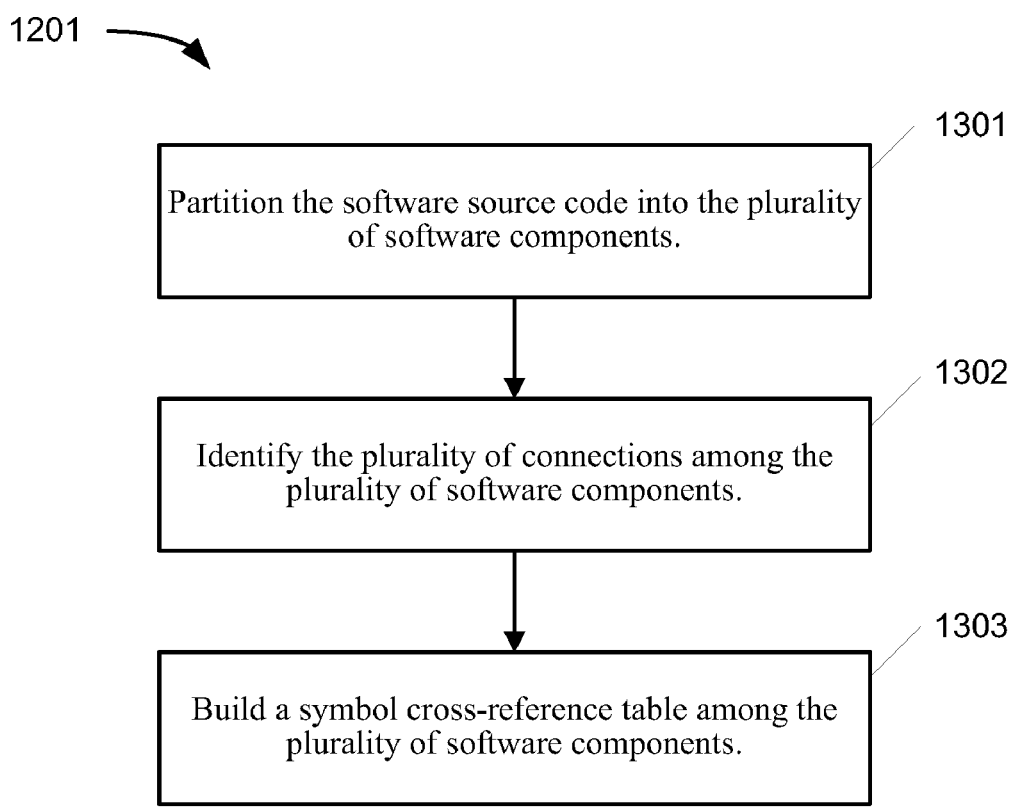
FIG. 13 is a flowchart further illustrating a method to visualize software architecture in one embodiment.

In one embodiment, as illustrated in the flowchart of FIG. 13, the operation of extracting multi-dimensional attribute information may include: partitioning the software source code into the plurality of software components (operation 1301); identifying the plurality of connections among the plurality of software components (operation 1302); and building a cross-reference table among the plurality of software components (operation 1303).

Figure 14:
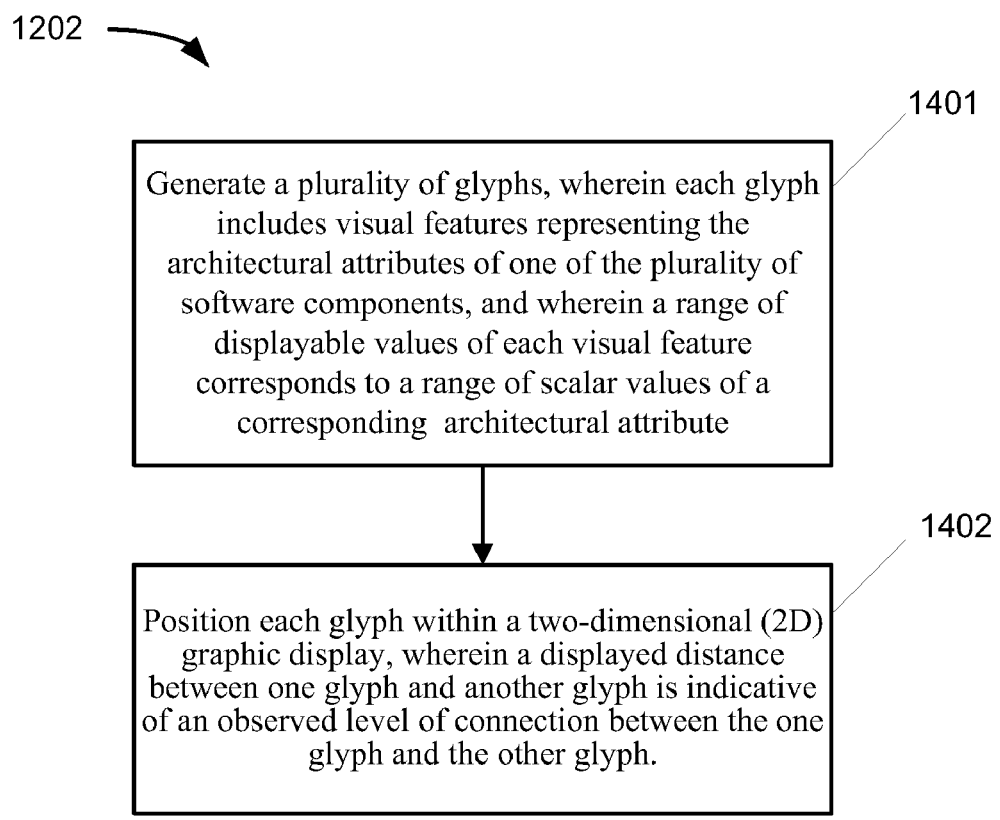
FIG. 14 is a flowchart further illustrating a method to visualize software architecture in one embodiment.

In one embodiment, as illustrated in the flowchart of FIG. 14, the operation of generating a graphical representation (operation 1202) may include: generating a plurality of geometrical objects (glyphs), where each glyph includes visual features representing the architectural attributes of one of the plurality of software components, and where a range of displayable values of each visual feature corresponds to a range of scalar values of a corresponding architectural attribute (operation 1401); and positioning each glyph within a two-dimensional (2D) graphic display, wherein a displayed distance between one glyph and another glyph is indicative of an observed level of connection between the one glyph and the other glyphs (operation 1402).

Figure 15:
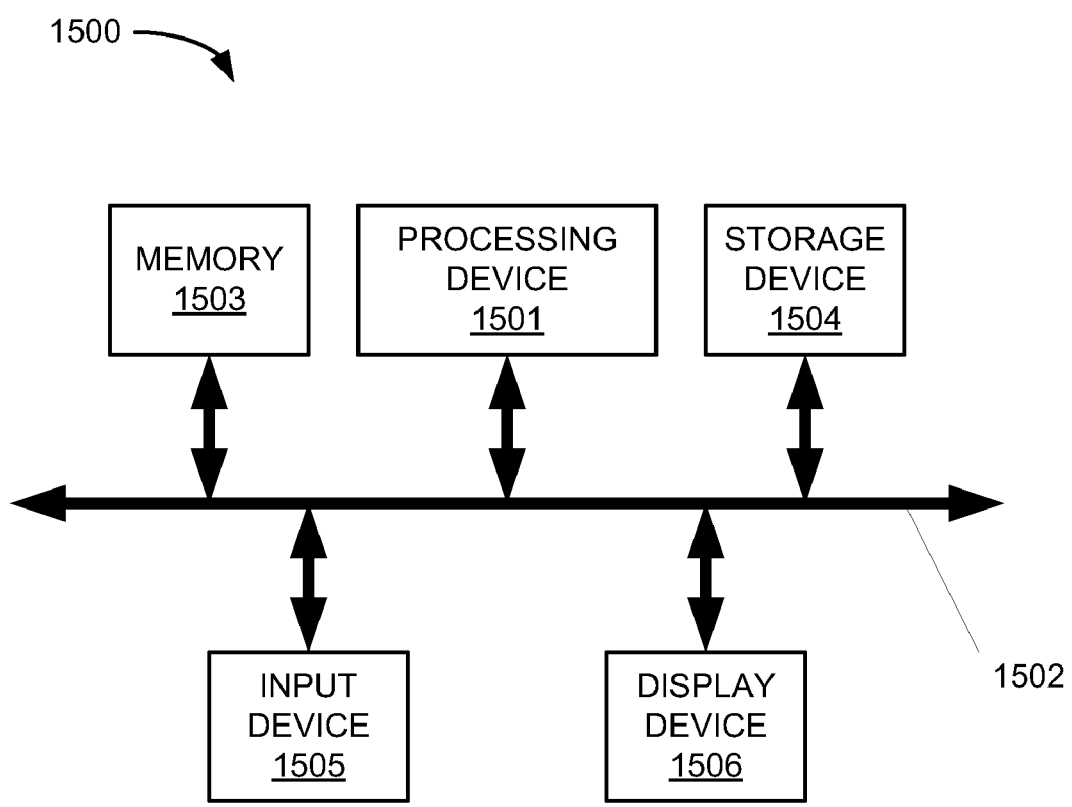
FIG. 15 is a block diagram illustrating a system in which embodiments of the invention may be implemented.

FIG. 15 is a block diagram illustrating a computing system 1500 in which embodiments of the invention may be implemented. Computing system 1500 may include a processing device 1501, which may be any type of general purpose (e.g., a RISC or CISC) or special purpose (e.g., DSP, ASIC, FPGA, etc.) processing device. Processing device 1501 may be coupled via a bus 1502 with a memory 1503, a storage medium 1504, an input device 1505 and a display device 1506. Processing device 1501 may be configured, for example, to execute instructions stored in storage medium 1504 and/or memory 1503 which may cause processing device 1501 to perform the operations of a method, such as method 1200 described above.

Figure 16:
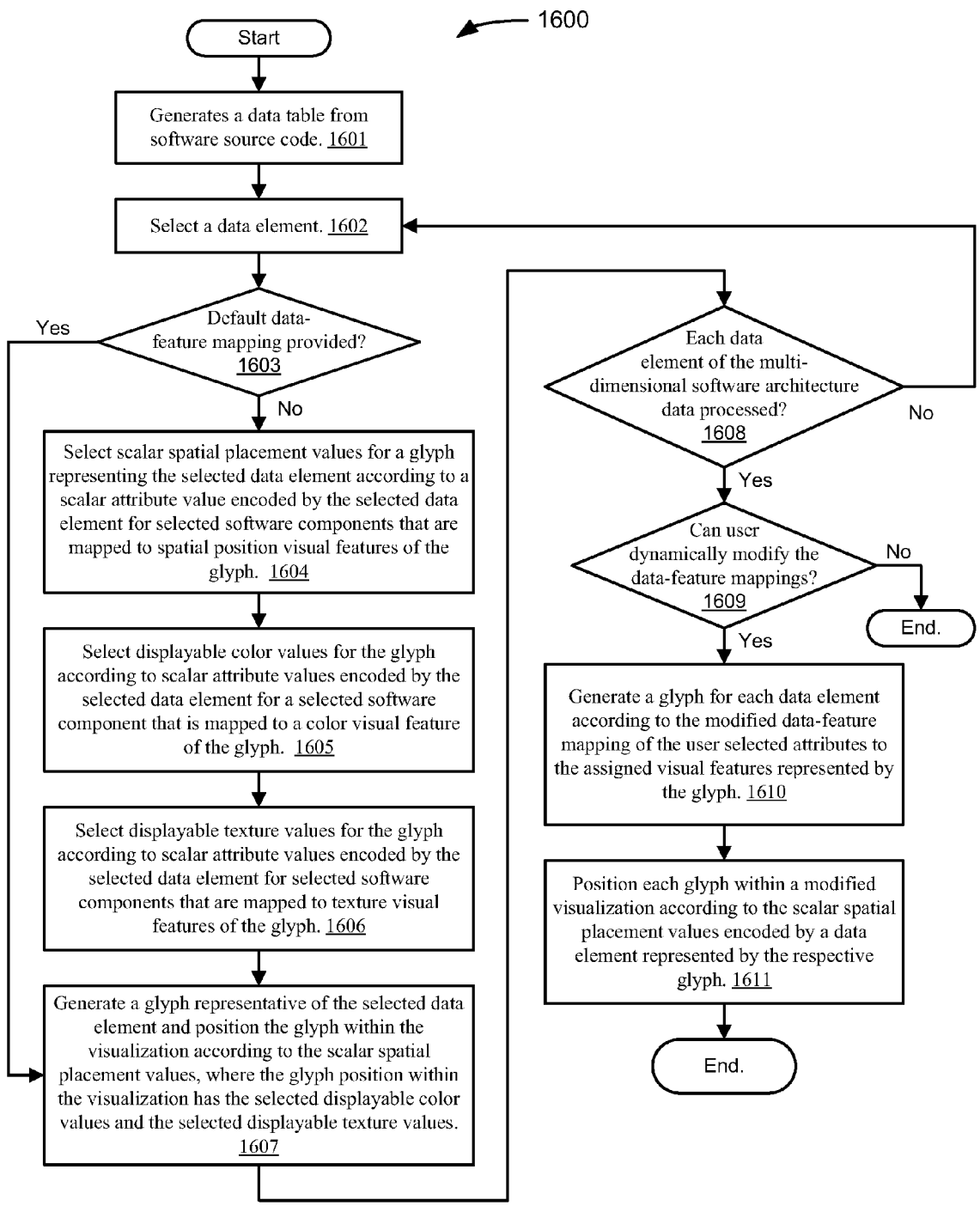
FIG. 16 is a flowchart further illustrating a method to visualize software architecture in one embodiment.

FIG. 16 is a flowchart illustrating certain aspects of a method 1600 for visualizing software architecture according to one embodiment. In one embodiment, the method illustrated with reference to FIG. 16 is performed, for example, using computing system 1500. Representatively, process block 1601 generates a data table (e.g., data table 1000) from software source code as described above. Next, process block 1602 selects a data element. Once selected, process block 1603 determines whether a default data-feature mapping is provided for the selected data element. A default data-feature mapping may map attributes of the data element to visual features (spatial position, color, texture) represented by a glyph according to a predetermined feature-mapping hierarchy. When such a default data-feature mapping is provided, control flow branches to process block 1607 for generation of a glyph representative of the selected data element according to the default data-feature mapping. Otherwise, a data-feature mapping may be selected by a user as shown with reference to process blocks 1604 to 1606 to generate a glyph representative of the selected data element.

Referring again to FIG. 16, process block 1604 selects scalar spatial placement values for a glyph representing the selected data element according to a scalar attribute value encoded by the selected data element for selected software components that are mapped to spatial position visual features of the glyph. Process block 1605 selects displayable color values for the glyph according to scalar attribute values encoded by the selected data element for a selected software component that is mapped to color visual features (e.g., hue and luminance) of the glyph. Process block 1606 selects displayable texture values for the glyph according to scalar attribute values encoded by the selected data element for selected software components that are mapped to texture visual features (e.g., height, size, orientation and transparency) of the glyph.

Following the completion of process blocks 1604-1606, the glyph for the selected data element has been generated. Once generated, process block 1607 positions the glyph within the visualization according to the scalar spatial placement values, where the glyph position within the visualization has the selected displayable color values and the selected displayable texture values. Process block 1608 determines whether each data element of the multi-dimensional software component data is processed. Accordingly, process block 1608 repeats process blocks 1602-1607 for each data element of the multi-dimensional software component data to produce a visualization of such multi-dimensional software component data.

In one embodiment, the method illustrated in FIG. 1600 may provide for generating a modified visualization under user control (e.g., variations such as those illustrated in FIGS. 9B, 9C, 11A and/or 11B). In one embodiment, method 1600 may generate a modified visualization to complete the visualization methodology as follows. Process block 1609 determines whether a modified set of user selected attributes of the multi-dimensional architecture data is received, including a modified data-feature mapping. When such a modified set of user selected attributes and the modified data-feature mapping are received, process block 1610 generates a glyph for each data element according to the modified data-feature mapping of the user selected attributes to the assigned visual features represented by the glyph. Once generated, process block 1611 positions each glyph within a modified visualization according to the scalar spatial placement values encoded by a data element represented by the respective glyph. Accordingly, in one embodiment, a visualization of multi-dimensional software architecture data is not static and may be dynamically modified by allowing users to select or remove attributes of multi-dimensional performance data selected for visualization.

Unless specifically stated otherwise, it is to be appreciated that throughout the discussions utilizing terms such as "processing" or "computing" or "calculating" or "determining" or "extracting" or "displaying" or the like may refer to the action and processes of a computer system or similar electronic computing device that manipulates and transforms data represented as physical (e.g. electronic) quantities within the computer systems, registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or configured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

What we claim is:

1. A method, comprising:
   automatically partitioning software source code into a plurality of software components at architectural boundaries defined by a software tool;
   extracting attribute information from the plurality of software components indicative of a plurality of connections among the plurality of software components; and
   generating a visual representation indicative of architectural attributes of the plurality of software components, the visual representation corresponding to a data-feature mapping between the attribute information and visual features of the visual representation, wherein generating the visual representation comprises:
   generating a plurality of glyphs, wherein each glyph includes visual features representing the architectural attributes of one of the plurality of software components, and wherein a range of displayable values of each visual feature corresponds to a range of scalar values of a corresponding architectural attribute, and
   positioning each glyph on a graphic display, wherein a displayed distance between one glyph and another glyph is indicative of an observed level of connection between the one glyph and said another glyph.

2. The method of claim 1, wherein the software source code comprises a plurality of lines of code, and wherein partitioning the software source code into the plurality of software components comprises associating each line of code with a software type and a software subtype defined by the software tool.

3. The method of claim 2, wherein the plurality of connections comprises direct procedure calls and accesses to global variables in the plurality of lines of code.

4. The method of claim 1, wherein
   the graphic display is a two-dimensional (2D) graphic display.

5. A system, comprising:
   a processing device coupled with a data storage device and a display device, wherein the data storage device is configured to hold a representation of software source code, and wherein the processing device is configured to:
   automatically partition the software source code into a plurality of software components at architectural boundaries defined by a software tool;

extract attribute information from the plurality of software components indicative of a plurality of connections among the plurality of software components; and generate a visual representation in the display device indicative of architectural attributes of the plurality of software components, the visual representation corresponding to a data-feature mapping between the attribute information and visual features of the visual representation;

generate a plurality of glyphs, wherein each glyph includes visual features representing the architectural attributes of one of the plurality of software components, and wherein a range of displayable values of each visual feature corresponds to a range of scalar values of a corresponding architectural attribute; and position each glyph on a graphic display, wherein a displayed distance between one glyph and another glyph is indicative of an observed level of connection between the one glyph and said another glyph.

6. The system of claim 5, wherein the software source code comprises a plurality of lines of code, and wherein to partition the software source code into the plurality of software components, the processing device is configured to associate each line of code with a software type and a software subtype defined by the software tool.

7. The system of claim 5, wherein the plurality of connections comprises direct procedure calls and accesses to global variables in the plurality of lines of code.

8. The system of claim 5, wherein the graphic display is a two-dimensional (2D) graphic display.

9. A computer-program product, comprising a computer-readable medium including data that, when read by a computer, cause the computer to perform operations, comprising:

automatically partitioning software source code into a plurality of software components at architectural boundaries defined by a software tool;

extracting attribute information from the plurality of software components indicative of a plurality of connections among the plurality of software components; and generating a visual representation indicative of architectural attributes of the plurality of software components, the visual representation corresponding to a data-feature mapping between the attribute information and visual features of the visual representation, wherein generating the visual representation comprises:

generating a plurality of glyphs, wherein each glyph includes visual features representing the architectural attributes of one of the plurality of software components, and wherein a range of displayable values of each visual feature corresponds to a range of scalar values of a corresponding architectural attribute, and positioning each glyph within a graphic display, wherein a displayed distance between one glyph and another glyph is indicative of an observed level of connection between the one glyph and said another glyph.

10. The computer-program product of claim 9, wherein the software source code comprises a plurality of lines of code, and wherein partitioning the software source code into the plurality of software components comprises associating each line of code with a software type and a software subtype defined by the software tool.

11. The computer-program product of claim 10, wherein the plurality of connections comprises direct procedure calls and accesses to global variables in the plurality of lines of code.

12. The computer-program product of claim 9, wherein the graphic display is a two-dimensional (2D) graphic display.

13. A system, comprising:

means for automatically partitioning software source code into a plurality of software components at architectural boundaries defined by a software tool;

means for extracting attribute information from the plurality of software components indicative of a plurality of connections among the plurality of software components; and means for generating a visual representation indicative of architectural attributes of the plurality of software components, the visual representation corresponding to a data-feature mapping between the attribute information and visual features of the visual representation, wherein the means for generating the visual representation comprise:

means for generating a plurality of glyphs, wherein each glyph includes visual features representing the architectural attributes of one of the plurality of software components, and wherein a range of displayable values of each visual feature corresponds to a range of scalar values of a corresponding architectural attribute, and means for positioning each glyph within a graphic display, wherein a displayed distance between one glyph and another glyph is indicative of an observed level of connection between the one glyph and said another glyph.

\* \* \* \* \*